(12) United States Patent
Cieslinski et al.

(10) Patent No.: US 8,929,672 B2
(45) Date of Patent: Jan. 6, 2015

(54) METHOD OF COMPRESSING IMAGE DATA

(75) Inventors: Michael Cieslinski, Ottobrunn (DE); Stefano Andriani, Munich (DE)

(73) Assignee: Arnold & Richter Cine Technik GmbH & Co. Betriebs KG, Munich (DE)

( * ) Notice: Subject to any disclaimer, the term of this patent is extended or adjusted under 35 U.S.C. 154(b) by 931 days.

(21) Appl. No.: 13/043,105

(22) Filed: Mar. 8, 2011

(65) Prior Publication Data

US 2012/0070095 A1   Mar. 22, 2012

(30) Foreign Application Priority Data

Mar. 9, 2010   (DE) .......................... 10 2010 010 736

(51) Int. Cl.
| | | |
|---|---|---|
| G06K 9/36 | (2006.01) |
| H04N 19/136 | (2014.01) |
| G06T 9/00 | (2006.01) |
| H04N 1/64 | (2006.01) |
| H04N 19/105 | (2014.01) |
| H04N 19/126 | (2014.01) |
| H04N 19/192 | (2014.01) |
| H04N 19/176 | (2014.01) |
| H04N 19/85 | (2014.01) |
| H04N 19/90 | (2014.01) |
| H04N 19/91 | (2014.01) |

(52) U.S. Cl.
CPC .......... *H04N 19/00139* (2013.01); *G06T 9/004* (2013.01); *H04N 1/646* (2013.01); *H04N 19/00024* (2013.01); *H04N 19/00096* (2013.01); *H04N 19/00357* (2013.01); *H04N 19/00278* (2013.01); *H04N 19/00903* (2013.01); *H04N 19/00945* (2013.01); *H04N 19/00987* (2013.01)
USPC .......................................... 382/239; 382/232

(58) Field of Classification Search
None
See application file for complete search history.

(56) References Cited

U.S. PATENT DOCUMENTS

| | | | | |
|---|---|---|---|---|
| 4,791,483 A |   | 12/1988 | Miller | |
| 5,553,200 A | * | 9/1996 | Accad ............................ | 358/1.9 |
| 5,708,732 A | * | 1/1998 | Merhav et al. ................ | 382/232 |
| 5,768,481 A | * | 6/1998 | Chan et al. ..................... | 358/1.2 |
| 6,005,623 A | * | 12/1999 | Takahashi et al. ........ | 375/240.16 |
| 6,016,360 A | * | 1/2000 | Nguyen et al. ................ | 382/166 |
| 6,088,392 A | * | 7/2000 | Rosenberg ............... | 375/240.03 |
| 6,115,496 A | * | 9/2000 | Nguyen et al. | |
| 7,421,127 B2 | * | 9/2008 | Bruls et al. .................... | 382/232 |
| 7,830,967 B1 | * | 11/2010 | Jannard et al. ........... | 375/240.26 |
| 8,149,914 B2 | * | 4/2012 | Shimauchi et al. ...... | 375/240.16 |
| 2004/0071356 A1 | * | 4/2004 | Sudharsanan et al. ........ | 382/244 |

(Continued)

OTHER PUBLICATIONS

European Search Report, dated May 25, 2011.

(Continued)

*Primary Examiner* — Sean Motsinger

(74) *Attorney, Agent, or Firm* — Amster, Rothstein & Ebenstein LLP

(57) ABSTRACT

In a method of compressing image data which include a plurality of pixel values which are associated with a respective pixel, the pixel values are coded for at least some pixels in accordance with the following steps:

determining an estimated pixel value of the respective pixel in dependence on the pixel value of at least one predetermined other pixel while using an estimation rule; and forming a difference value of the respective pixel which corresponds to a predefined relation between the pixel value and the estimated pixel value of the respective pixel and quantization of the difference value in accordance with a difference value quantization rule.

The quantized difference values of the pixels are compressed in accordance with a compression rule.

44 Claims, 13 Drawing Sheets

(56) References Cited

U.S. PATENT DOCUMENTS

| | | | | |
|---|---|---|---|---|
| 2005/0105814 | A1* | 5/2005 | Bruls et al. | 382/240 |
| 2007/0112564 | A1* | 5/2007 | Jelinek | 704/219 |
| 2007/0160126 | A1* | 7/2007 | Van Der Meer et al. | 375/240 |
| 2008/0291319 | A1 | 11/2008 | Jannard et al. | |
| 2008/0304567 | A1* | 12/2008 | Boyce et al. | 375/240.16 |
| 2009/0190849 | A1* | 7/2009 | Huang | 382/244 |
| 2010/0021071 | A1* | 1/2010 | Wittmann et al. | 382/232 |
| 2012/0057800 | A1* | 3/2012 | Guleryuz et al. | 382/233 |

OTHER PUBLICATIONS

English Translation of European Search Report, dated May 25, 2011.
Netravali et al: "Picture Coding: A Review", Proceedings of the IEEE, IEEE, New York, NY, U.S. vol. 68, No. 3, Mar. 1, 1980, pp. 336-407.
Marcelo J. Weinberger et al., "The Loco-1 Lossless Image Compression Algorithm: Principles and Standardization into JPEG-LS", IEEE Transactions on Image Processing, IEEE Service Center, Piscataway, NJ, U.S. vol. 9, No. 8, Aug. 1, 2000.
Kolpatzik B.W., et al.: Optimized Error Diffusion for Image Display, Journal of Electronic Imaging, Spie/IS&T, vol. 1, No. 3, Jul. 1, 1992, pp. 277-292.
Bazhyna, A. et al.: "Lossless and near lossless compression of real color filter array data", IEEE Transactions on Consumer Electronics, IEEE Service Center, New York, NY, U.S. vol. 54, No. 4, Nov. 1, 2008, pp. 1492-1500.
Ning, Zhang et al: "Lossless compression of color mosaic images", Image Processing, 2004, ICIP '04, 2004 International Conference on Singapore Oct. 24-27, 2004, Piscataway, NJ, USA, IEEE, vol. 1, Oct. 24, 2004, pp. 517-520.
German Seach Report of German Patent Application No. 10 2010 010 736.0 dated Oct. 22, 2010.
Wang, Limin: Error accumulation in hybrid DPCM/DCT video coding. In: SPIE, Visual Communication and Image Processing, vol. 2308, Sep. 16, 1994, pp. 343-352, DOI: 10.1117/12. 185977 Fig. 2.
Roberts L: "Picture coding using pseudo-random noise", IRE Transactions on Information Theory, IEEE, USA, vol. 1, No. 2, Feb. 1, 1962, pp. 145-154, XP011217272, ISSN: 0096-1000.

* cited by examiner

| row | order |
|---|---|
| 1 | 1 |
| 2 | 3 |
| 3 | 2 |
| 4 | 5 |
| 5 | 4 |
| 6 | 7 |
| 7 | 6 |
| 8 | 9 |
| 9 | 8 |

Fig. 11

| row | order |
|---|---|
| 1 | 1 |
| 2 | 3 |
| 3 | 2 |
| 4 | 5 |
| 5 | 4 |
| 6 | 7 |
| 7 | 6 |

| 1 | x | 2 | x | 3 | x | 4 | x | 5 | x | 6 | x |
|---|---|---|---|---|---|---|---|---|---|---|---|
| x | 13 | x | 14 | x | 15 | x | 16 | x | 17 | x | 18 |
| 7 | x | 8 | x | 9 | x | 10 | x | 11 | x | 12 | x |
| x | 25 | x | 26 | x | 27 | x | 28 | x | 29 | x | 30 |
| 19 | x | 20 | x | 21 | x | 22 | x | 23 | x | 24 | x |
| x | 37 | x | 38 | x | 39 | x | 40 | x | 41 | x | 42 |
| 31 | x | 32 | x | 33 | x | 34 | x | 35 | x | 36 | x |

Fig. 12

METHOD OF COMPRESSING IMAGE DATA

The invention relates to a method of compressing image data which include a plurality of pixel values which are associated with a respective pixel.

Such image data are typically generated in an electronic camera, in particular in a digital moving image camera, by means of an image sensor. The image sensor usually includes a plurality of light-sensitive sensor elements which are arranged in rows and columns and correspond to a respective pixel (picture element). The sensor elements generate electric signals in dependence on the incident light which correspond to a respective brightness value. The sensor elements can be provided with a pattern of color filters so that each brightness value is associated with a color channel, in particular red, green and blue. For this purpose, the so-called Bayer pattern is known in which a red filter element, two green filter elements and a blue filter element are respectively provided in a regular arrangement.

The volume of the image data has substantially increased in modern camera as the spatial resolution increases, i.e. as the number of pixels per image increases. Compression processes are therefore used to compress the image data generated in the camera and to write them to a memory of the camera or to output them to an external memory in compressed form. The compressed image data can be decompressed again later. Loss-free and lossy compression processes as well as combinations thereof are known for this purpose.

It is in particular known to transform the image data in the frequency space (e.g. by discrete cosine transformation in accordance with JPEG or with the aid of wavelets in accordance with JPEG 2000), wherein the representation in the frequency space takes place by coefficients which each describe the amplitude of specific frequencies. To compress the data, these coefficients are quantized in dependence on the frequency, with the coefficients corresponding to the high frequencies being transmitted imprecisely or being discarded. Fine and high-frequency structures in the image are hereby removed. Images compressed in this manner therefore frequently have a very smooth, washed-out and slightly blurred image impression. The image errors which arise in the compression are difficult to predict and are moreover not restricted to individual pixels, but rather occur as additional structures (so-called artifacts). In addition, the transformation into the frequency space is associated with a high calculation effort so that fast implementations such as are required for moving image cameras are associated with a correspondingly high technical effort.

Another type of image data compression takes place in the coding as a so-called GIF image. In this process, no frequency space transformation takes place, but the brightness resolution is rather reduced to a few shades. The error arising in the quantization of a pixel is subsequently taken into account in the processing of further pixels to average out these errors (so-called dithering). This process is admittedly simple to implement, but the decompressed images contain a very high amount of noise and the compression factor is comparatively small with natural images such as an electronic camera produces.

It is an object of the invention to provide a compression process which achieves a good quality of the decompressed images and avoids the formation of artifacts with a small calculation effort with a low to medium compression factor.

This object is satisfied by a process having the features of claim 1, in particular in that the pixel values for at least some pixels are coded in accordance with the following steps:

(b) determining an estimated pixel value of the respective pixel in dependence on the pixel value of at least one predetermined other pixel while using at least one estimation rule; and (d) forming a difference value of the respective pixel which corresponds to a predetermined relation between the pixel value and the estimated pixel value of the respective pixel and quantization of the difference value in accordance with a difference value quantization rule;

wherein the quantized difference values of the pixels are compressed in accordance with a compression rule.

In summary, a coding of the pixel values for at least some of the pixels is first carried out in the compression process. These pixel values can, in connection with the invention, directly be the respective brightness value of the respective pixel or the respective pixel value was quantized before the coding or is quantized during the coding in accordance with a brightness value quantization rule and is thus present as a quantized brightness value, i.e. as a so-called index value. Alternatively to this, the respective pixel value can also be a modified brightness value or a modified index value, for example when the brightness value or index value of a color (e.g. red or blue) is offset before the compression by the brightness value or index value of another color (e.g. green) (e.g. by formation of a difference or of a quotient). The formation of difference values which are quantized simultaneously or in a separate step takes place using the pixel values during the coding. The named coding of the pixel values thus corresponds to a lossy compression. The values resulting from this encoding, the so-called quantized difference values, are then compressed in accordance with a predetermined compression rule, preferably in a loss-free manner, for example in accordance with the Huffmann encoding or an arithmetical encoding.

In detail, within the framework of the coding in a step (b), an estimated pixel value is determined for the respective pixel, i.e. an estimation value is predicted. At least the pixel value of one other pixel is used as the basis for this prediction while using at least one predetermined estimation rule, with this other pixel being provided in a predetermined arrangement indirectly or directly adjacent to the currently observed pixel (for which the coding is just being carried out). In a "predetermined arrangement" in this connection means that the position of the observed other pixel is defined and is thus also known in the later decoding. A plurality of predetermined other pixels are preferably considered for this estimation. In other words, in step (b), despite a knowledge of the pixel value of the observed pixel, this pixel value is predicted with reference to a predetermined pixel value environment, with this being done in accordance with one or more predetermined instructions (so-called estimation rules).

In a step (d), a difference value is formed which corresponds to the difference between the pixel value and the estimated pixel value of the respective pixel. In other words, this difference value ultimately corresponds to an error in the prediction carried out. The named difference value can be exactly the difference between the pixel value and the estimated pixel value which is formed by a subtraction. This is, however, not necessarily the case. The pixel value and the estimated pixel value can alternatively in particular also be offset with one another in a non-linear fashion, for example by using a so-called look-up table (LUT). Provision can, for example be made that large differences between the pixel value and the estimated pixel value are treated differently than relatively smaller differences.

In the named step (d), a quantization of the respective difference value takes place, i.e. the difference values are associated with predetermined quantization stages. The difference value quantization rule used in this respect lays down which quantization stage a respective difference value is associated with. In this respect, the number of provided quantization stages is typically smaller than the number of the possible difference values. The named formation of a difference value and quantization of the respective difference value can take place in a single common step (for example by using a look-up table) or the two processes are carried out sequentially separately from one another.

In the already mentioned subsequent compression, the quantized difference values of the pixels are compressed (preferably in a loss-free manner) in accordance with a predetermined compression rule. A known compression process can be used for this purpose. A control of the compression rate can in particular also be provided in this respect (so-called "bit rate control"). The image data compressed in this manner have a reduced data quantity and can be stored in this form in the camera or can be output to an external memory medium.

An advantage of the process is that the named difference values are relatively small, in particular in comparison with the pixel values. As explained, the difference values namely only correspond to the deviation of the prediction from the actual pixel value. Since the difference values are relatively small, an improved efficiency of the explained following compression results in accordance with the predetermined compression rule. An improved compression factor is thus achieved overall.

In order to be able to form the named difference values, in accordance with step (b), the estimated pixel values previously have to be predicted. Since this is done in dependence on the respective pixel value of predetermined other pixels, a corresponding prediction can also be carried out on a following decompression of the image data based on the already decoded pixel values. In this respect, the steps explained above are carried out in a matched manner and order to obtain a respective further decoded pixel value.

In this manner, the later decompression of the image data can, for example, take place in that first the explained quantized difference values of the pixels are decompressed in accordance with a predetermined decompression rule, with this decompression rule corresponding to a reversal of the previously applied compression rule and with the pixel values subsequently being decoded in accordance with the following steps:

(e) determining a reproduced estimated pixel value of the respective pixel in dependence on at least one previously decoded pixel value which corresponds to the at least one predetermined other pixel while using the at least one estimation rule; and (g) determining a back-transformed difference value of the respective pixel in dependence on the decompressed quantized difference value while using a difference value back-transformation rule which corresponds to a reversal of the difference value quantization rule, and determining a decoded pixel value of the respective pixel in dependence on the back-transformed difference value and on the reproduced estimated pixel value of the respective pixel.

In other words, the image data are first decompressed in order again to obtain the quantized difference values underlying the previous compression. A decoding of the pixel values then takes place, wherein the steps carried out in the coding are reversed or reproduced in a correspondingly matched order. On the one hand, analog to the prediction in accordance with step (b) of the encoding, the determination of a so-called reproduced estimated pixel value of the respective pixel takes place in step (e), and indeed in turn in dependence on at least one (or more) pixel value(s) of the predetermined other pixel which was also taken into account in the coding in accordance with step (b). In this respect, the same estimation rule is used as in the previous coding in accordance with step (b). However, use is now not made of the actual pixel value (since it is not available), but rather of a previously already decoded pixel value. In other words, step (e) can only be carried out for those pixels for which the pixel value of the predetermined other pixel has already been decoded (or a suitable replacement value is present, as will be explained in the following).

On the other hand, in step (g), a back-transformed difference value is determined for the respective pixel, and indeed in dependence on the decompressed quantized difference value while using a difference value back-transformation rule which corresponds to a reversal of the difference value quantization rule used in the coding. The reproduced estimated pixel value in accordance with step (e) is offset in step (g) with the back-transformed difference value to determine the decoded pixel value of the respective pixel. For example, the back-transformed difference value is added to the reproduced estimated pixel value or is subtracted from the reproduced estimated pixel value, corresponding to a reversal of the formation of the difference value in accordance with step (d). In other words, the estimation carried out on the coding is now ultimately used to calculate back to the actual pixel value from the reproduced estimated pixel value.

The named determination of a back-transformed difference value and determination of a decoded pixel value can take place in a single common step (for example by using a look-up table) or the two processes are carried out sequentially separately from one another.

As a result, a context between the observed pixel values in the spatial region can therefore be utilized, i.e. without any preceding transformation into the frequency space, by using an estimator which pre-estimates the brightness (pixel value) of the currently processed pixel from an already coded part of the image. The estimation rule used can be based, for example, on the assumption that the brightness of a pixel is frequently similar to the brightness of the environment of this pixel, with the mean brightness of the environment, for example, being used as the value for the prediction. Since the compression thus takes place without frequency space transformation, compression errors remain limited to individual pixels and the effect of the compression on the image can be better predicted. The image also does not become "blurred" at higher compression factors. Specific quality specifications can be observed such as that the noise may be increased at most by 50% on average.

So that the decoding can take place as exactly as possible, it is necessary only to use the information for the coding which is also available in the later decoding at the respective point in time. The estimation rule used should in particular only work on the basis of pixel values which have previously already been coded and decoded again. It is therefore preferred if, before the determination of the estimated pixel value of the currently observed pixel in dependence on the pixel value of the predetermined other pixel in the named step (b), the pixel value of the named predetermined other pixel is first coded and decoded again. The respective pixel value of the predetermined other pixel value thus has the same value in the coding as is also available for the estimation in the later decoding of the pixel value of the respective pixel (that is in the step (e): reproduced estimated pixel value). A higher precision of the process is thereby achieved.

Advantageous embodiments of the invention are described in the following and in the dependent claims.

In accordance with a simple embodiment, the same difference value quantization rule, i.e. a single common difference value quantization rule, is always used for the quantization of all difference values to determine the respective quantized difference value. Alternatively to this, however, at least one of a plurality of different difference value quantization rules can be selected in each case for the quantization of a respective difference value within the same image or for different images in accordance with a predetermined selection rule.

In accordance with a further embodiment, the difference value in accordance with the named step (d) is not quantized and subsequently compressed for each pixel, but the named step (d) can instead be modified from case to case. It is in particular possible that the difference value formed in step (d) is compared with a predetermined threshold value. If the difference value is larger in amount than the threshold value, instead of the difference value a replacement value is quantized (preferably in accordance with the named difference value quantization rule) and subsequently compressed (in accordance with the named compression rule). In exceptional cases, instead of the formed difference value, a replacement value is therefore hereby used for the further signal processing (quantization and compression) which is preferably smaller than or equally as large as the named threshold value. The efficiency of the compression can hereby be improved even further. Such an exception rule then naturally also has to be taken into account in an analog manner in the later decoding of the pixel values.

In accordance with an advantageous embodiment, in accordance with the difference value quantization rule used in step (d), difference values with larger absolute amounts are quantized more coarsely than difference values with relatively smaller absolute amounts. In other words, a larger interval of difference values is associated with a predetermined quantization stage for difference values larger in amount than for difference values smaller in amount. Not only a substantial reduction of the data quantity is achieved by such a quantization of the difference values. Above all a loss of information only takes place in those image zones in which only a small proportion of the total image information is anyway present. In addition, this portion of the image information is anyway difficult to predict for the human eye. This special type of quantization is thus ultimately not perceptible or hardly perceptible for the human eye. Nevertheless, a significant reduction of the data quantity is achieved.

Alternatively to this, the difference vale quantization rule can, however, correspond to a linear stage function.

In accordance with a further embodiment, in or after the named step (d) of the quantization of the respective difference value, a quantization error for the respective pixel can be determined, wherein the quantization error is taken into account for the subsequent quantization of the difference value of at least one other pixel (in particular of an adjacent pixel). It can hereby be achieved that the sum of the quantization errors for the majority of the pixel values does not grow or does not grow excessively, i.e. the total quantization error resulting from all quantizations is limited.

The respective quantization error is preferably determined in that the quantized difference value of the respective pixel is back-transformed during the coding of the pixel values while using a difference value back-transformation rule which corresponds to a reversal of the difference value quantization rule and in that a respective difference between the back-transformed difference value and the original difference value (i.e. the not yet quantized difference value of the respective pixel) is formed. The quantization error determined for the respective pixel can be taken into account for the later quantization of the difference value of at least one other pixel, for example such that the quantization error is partly or fully added onto the difference value of the respective other pixel or is subtracted from the difference value (depending on the selection of the sign of the quantization error) before or while the difference value quantization rule is applied to the difference quantization rule.

Alternatively to this, the quantization error determined for the respective pixel can be taken into account for the later quantization of the difference value of at least one other pixel such that a quantization correction is carried out for the quantized difference value of the respective other pixel (in dependence on the magnitude of the quantization error) after the difference value quantization rule has been applied to the difference value of the respective other pixel. In other words, the quantization of the difference value of the respective other pixel is seen as a rounding since the difference value is associated with one of a plurality of quantization stages (rounding up or down). This rounding is corrected as necessary in dependence on the determined quantization error. For example, a residual quantization value can be added to the quantization error determined for the respective pixel or can be subtracted from the quantization error to determine a modified quantization error. The named residual quantization value is for this purpose determined in dependence on the quantized difference value of the respective other pixel and the determined quantization error is converted, preferably in accordance with the difference value quantization rule, before the adding or the subtracting of the residual quantization value so that both values (quantization error and residual quantization value) are normed with respect to one another. In this embodiment, the quantized difference value of the respective other pixel is incremented by a positive or negative quantization stage (=quantization correction) if the modified quantization error exceeds or falls below a predetermined threshold value. For example, in a particularly simple embodiment, the named residual quantization value can be determined after the quantization of the difference value of the respective other pixel in a simple manner as the value of a predetermined number of least value bits of the quantized difference value (e.g. value after the decimal point), with this residual quantization value being added to the quantization error (converted by means of the difference value quantization rule) (=modified quantization error) and with the quantized difference value of the respective other pixel being incremented by a positive unit if the modified quantization error exceeds a predetermined threshold value (e.g. threshold value 0.5).

The quantization error is therefore used in all of these embodiments to modify the application of the difference value quantization rule for the later quantization of the difference value of at least one other pixel to limit the total quantization error for the majority of the pixel values. In this respect, the respective quantization error determined for the respective pixel can always only be taken into account as an individual value for the later quantization of the difference value of the respective other pixel (i.e. without also taking account of the previously determined quantization error) or the determined quantization errors are accumulated so that the quantization error is generally taken into account in accumulated form.

The explained quantization error can also be taken into account in an advantageous manner when the pixels are arranged in a plurality of rows and columns, with the columns being associated with a plurality of column groups of which each includes a plurality of columns. In such an embodiment, the pixel values within each column group can be coded row-wise and the pixel values of the different column groups can be coded in parallel. A separate processing unit can be provided for each column group for this purpose so that the coding can take place particularly fast. The individual processing units can in this respect even work at a relatively low speed, whereby a comparatively small power loss results overall which increases disproportionately with the clock rate in electronic circuits. In order to take account of the respective quantization error as effectively as possible despite such a division of the columns into column groups, a quantization error determined in the column group is used for the coding of the respective row or of a subsequent row in at least one adjacent column group after reaching a respective row end in one of the plurality of column groups. In other words, the quantization error determined for a row within a column group is forwarded to the adjacent column group or to the adjacent column groups (or to their processing units) so that the respective quantization error can also be taken into account their across column groups to limit the total quantization error. The respective quantization error can naturally also additionally be used in the original column group for the coding of a subsequent row.

As already mentioned, the pixel values to be coded can directly be the respective brightness value of the respective pixel. Alternatively to this, the respective pixel value can, however, already have been quantized before the coding or the respective pixel value is quantized during the coding in accordance with a brightness value quantization rule. Such a quantized pixel value is also called an index value in connection with the invention. In the case of the last-named alternative, the coding of the pixel values before the formation of the difference value of the respective pixel additionally includes the step:

(a) quantizing the pixel value of the respective pixel while using at least one brightness value quantization rule;

The determination of the estimated pixel value of the respective pixel in accordance with the aforesaid step (b) takes place in this case in dependence on the quantized pixel value—i.e. in dependence on the index value—of the at least one predetermined other pixel while using the at least one estimation rule. This is necessary since in this case use is also made of the quantized pixel value (i.e. of the decoded index value) of the respective predetermined other pixel in the later decoding for the determination of the reproduced estimated pixel value in the step (e) explained in the following. The estimated pixel value determined in step (b) thus likewise corresponds to a quantized value, i.e. to an estimated index value. The formation of the difference value of the respective pixel in step (d) then takes place using the quantized pixel values, i.e. using the named index values, with in this case the difference value also being called an index difference value in the following.

The brightness value quantization rule used for the quantization of the pixel value lays down which quantization stage a respective pixel value is associated with. In accordance with an embodiment, a single common brightness value quantization rule can be used for all of the pixel values to determine the respective index value. A particularly simple coding hereby results. Alternatively to this, it is, however, possible to select at least one of a plurality of different brightness value quantization rules for different pixel values. The selection can, for example, take place in dependence on the kind of image data to be compressed, for example to carry out an adapted noise-optimized quantization as explained above. In this respect, is it in particular possible to distinguish between image data of an electronic image sensor of a camera and image data of a scanned photographic film. The selection of a respective brightness value quantization rule can take place uniformly for a total image. However, different brightness value quantization rules can also be selected for different pixels within the same image in accordance with a predetermined quantization rule.

The additional noise which arises due to the quantization of the pixel values rather has an effect like film grain and is therefore not felt to be so irritating, in particular when the quantization is carried out in a noise-optimized manner in dependence on the respective pixel value, as will be explained in the following.

Provision can be made for the quantization of the pixel values in the aforesaid step (a) that larger pixel values are quantized more coarsely than relatively smaller pixel values in accordance with the brightness value quantization rule. Similar to the already explained difference value quantization rule, a larger interval of pixel values is associated with a predetermined quantization stage (index value) for larger pixel values than for pixel values smaller in amount. Not only a reduction of the data quantity is hereby achieved, but also a noise-optimization of the quantization for an electronic camera.

The brightness signals generated by a sensor element of an electronic image sensor, which correspond to the named pixel values, namely also contain photon noise in addition to a fixed noise portion which results, for example, from the read-out electronics of the sensor. This noise has a standard deviation which corresponds to the root of the number of photons which generate the brightness signal. This means that the noise of the sensor in the dark (low pixel values) is small, but grows as the brightness increases (higher pixel values). Since the quantization is selected as coarser for higher pixel values than for lower pixel values, the gradation underlying the quantization (i.e. the intervals between the named index values follows the behavior of the sensor noise. The comparatively coarse quantization for higher pixel values is thus not perceived due to the likewise increased photon noise; however, it does result in a greater reduction of the data quantity. The brightness value quantization rule can in particular correspond to a root function or to another degressive course of the dependence of the index values on the pixel values to reproduce the behavior of the photon noise.

Alternatively to this, a loss-free quantization of the pixel values, i.e. without a reduction in the data quantity, can be provided (e.g. conversion of the pixel values from 16 bits to 16 bits), in particular to adapt or modify a characteristic of the camera used (adaptation to the characteristic of the image data source).

In the case of the explained quantization of the pixel values, a quantization error can be determined for the respective pixel in an analog manner to the determination and taking account of a quantization error in the quantization of the difference values (and indeed additionally or alternatively thereto), with the quantization error being taken into account for the subsequent quantization of the pixel value of at least one other pixel (in particular an adjacent pixel). A quantization error is therefore preferably also determined in this case in that the determined quantized pixel values (index values) of the respective pixel are back-transformed again during the coding of the pixel values while using a pixel value back-transformation rule which corresponds to a reversal of the brightness value quantization rule, with the respective difference being formed between the back-transformed pixel value and the original pixel value. The determined quantization errors are used to modify the application of the brightness value quantization rule for the later determination of the respective quantized pixel value of further pixels such that the sum of the quantization errors does not grow or does not grow excessively. This in particular be done by a correspondingly adapted selection of the respective quantization stage or in that the determined quantization error is partly or fully added to the pixel value of the respective further pixel or is subtracted from the pixel value before or while the brightness value quantization rule is applied to this pixel value.

In accordance with a further embodiment, the determination of the estimated pixel value of the respective pixel takes place in dependence on the respective pixel value of a plurality of predetermined other pixels, wherein some of these pixels are arranged directly adjacent to the respective pixel and some further of these pixels are only arranged indirectly adjacent to the respective pixel. In other words, the pixel values of a plurality of pixels which are arranged adjacent to the observed pixel are taken into account for the prediction of the estimated pixel value in accordance with step (b) during the coding. An "adjacent" pixel does not necessarily have to be arranged directly adjacent to the respective pixel in connection with the invention, but rather some of the pixels taken into account can also only be arranged indirectly adjacent to the respective pixel, i.e. at least one pixel lies between the respective pixel and the indirectly adjacent pixel. A row of pixels whose pixel values are not taken into account for the coding of the pixel value of the respective pixel can in particular lie between the respective pixel and the predetermined other pixel. The same naturally also applies accordingly to the decoding of the pixel values since generally the same predetermined other pixels are taken into account in the decoding which were also taken into account in the coding.

In accordance with a preferred embodiment, the pixels are provided in an arrangement of a plurality of rows, with the pixel values being coded row-wise and with the determination of the estimated pixel value of the respective pixel taking place in dependence on the respective pixel value of a plurality of predetermined other pixels which are arranged in an already coded row. This already coded row is arranged adjacent to that row in which the respective (currently observed) pixel is arranged. In other words, the prediction of the estimated pixel value in accordance with step (b) is in turn based on the taking into account of the pixel values of a plurality of other pixels, with these predetermined other pixels being arranged in at least one row. This row is located adjacent to that row in which the observed pixel is arranged (for which the coding is currently being carried out). The environment observed for the prediction of the estimated pixel value can thus lie in a previously coded (and decoded again) row. Analog to this, a plurality of already coded (and decoded again) rows can also be used for the determination of the estimated pixel value.

It is particularly advantageous if the pixels are provided in an arrangement of a plurality of rows, with the pixel values being coded row-wise in accordance with a predetermined row order such that pixel values of the respective third-next row and pixel values of the respective preceding row (in each case considered from the currently observed row) being alternately coded, with the determination of the estimated pixel values of the respective pixel taking place in dependence on the pixel value of at least one predetermined other pixel which is arranged in the row pre-preceding it for the coding of pixel values of the named respective third-next row, and with the determination of the estimated pixel value of the respective pixel taking place in dependence on the respective pixel value of a plurality of other pixels which are arranged in the row preceding it and in the row following it for the coding pixel values of the named respective preceding row. A corresponding procedure is then also followed in the decoding of the pixel values.

In other words, the prediction of the estimated pixel value in accordance with step (b) is in turn based on the taking into account of the pixel values of a plurality of other pixels, with two groups of rows being distinguished: For the coding of the pixel values of a row of the first group (e.g. even number rows), the estimation takes place in dependence on the respective pixel value of one or more pixels which are arranged, from the view of the currently observed row, in the row which pre-precedes it (spatially) and which has already been coded. This ultimately corresponds to a "skipping" of a row. In this respect, all pixel values of the named pre-preceding row naturally do not have to be taken into account. It has, however, been found that no substantial deterioration of the prediction occurs if no pixel values of the respective preceding row are taken into account, but rather only of the respective pre-preceding row. The estimation in contrast takes place for the coding of the pixel values of a row of the second group (e.g. odd number rows) in dependence on the respective pixel value of pixels which are arranged from the view of the currently observed row in the row (spatially) preceding it and in the row (spatially) next to it which have already been previously coded. It has been found that a significant improvement of the prediction occurs when pixel values of both the respective preceding row and of the respective next row are taken into account. In this respect, however, not all pixel values of the named preceding row and of the named next row have to be taken into account, either. Deviations from this concept can naturally be provided for the rows of the image margins.

It is particularly advantageous in the explained row-wise coding if the estimated pixel value is only determined for every second pixel within the respective row, in particular offset by one column row-wise. For example, in the odd number rows, only the pixel values of the pixels of the odd number columns are coded and in the even number rows only the pixel values of the even number columns are coded (or vice versa). A pattern of coded pixels hereby arises for which the four diagonally adjacent pixels are likewise already coded and the four directly adjacent pixels (i.e. the two horizontally adjacent pixels and the two vertical adjacent pixels) have not yet been coded. Deviations from this concept can naturally in turn be provided for the rows and columns of the image margins. The remaining pixel values are coded on the basis of the pixel values coded in this manner, with this not having to take place in the explained row order (alternate consideration of the respective third-next row and of the respective preceding row). It is rather important that the estimated pixel value can now be determined in dependence on the respective pixel value of one or more of the four directly adjacent pixels since they have already been coded (and preferably decoded again). This process is particularly advantageous when the image data include pixel values of a first, second and third color. The pixel values of the first color (e.g. green) are preferably first coded in accordance with the predetermined row order in dependence on already coded pixel values of the first color. As soon as the coding of the pixel values of the first color is concluded or has progressed sufficiently, the pixel values of the second and third colors (e.g. red and green) can be coded in dependence on already coded pixel values of the first color.

With respect to the named estimation rule, in accordance with the estimation rule in step (b), the determination of the estimated pixel value can take place in dependence on an averaged value of the pixel values of a plurality of predetermined other pixels. A high accuracy of the prediction can hereby be achieved.

However, other or additional parameters can also be taken into account for the prediction of an estimated pixel value. For example, in accordance with the estimation rule, an edge structure can be taken into account which is included in the image information of the pixel values of the predetermined other pixels taken into account. Such an edge structure can be identified by means of known algorithms. Edges which are recognized in the image environment of the respective pixel can thus be continued in the region of the respective pixel to achieve a higher accuracy with respect to the prediction.

In a similar manner to the possible use of a plurality of different quantization rules, at least one of a plurality of different quantization rules can be selected for the determination of the estimated pixel value of the named step (b, with in particular the most favorable estimation rule for the respective pixel being selected. Which estimation rule is the most favorable can be determined both in the coding and in the decoding with respect to the present image data or the estimation rule is selected in the coding and is included in the image data as additional information (for the decoding).

It is preferred in this embodiment if a plurality of estimated pixel values are determined for the respective pixel while using different estimation rules, with a significance value being generated for each estimation rule. At least one of the estimation rules is selected in dependence on the generated significance values for the coding. For example, the estimation rule having the highest significance value can be selected. It is also possible to form a weighted mean from the determined plurality of estimated pixel values (in accordance with the different estimation rules), with the weighting taking place in dependence on the respective significance value. Estimators for frequently occurring structures can for formed by the provision of different estimation rules; for example optimized for edges extending in perpendicular manner, optimized for horizontally extending edges and optimized for diagonally extending edges. The quality of the prediction can be increased by the use of a plurality of such estimators.

In accordance with a further embodiment, at least one set of image zone values is generated in dependence on the pixel values before the coding of the pixel values. Each image zone value is associated with a group of pixels, i.e. with a plurality of pixels (but fewer pixels than the total number of the pixels of the respective image). The image zone values thus form an image of reduced spatial resolution pin comparison with the image data to be compressed, i.e. in comparison with the named plurality of pixel values). In this case, the determination of the estimated pixel value of the respective pixel takes place in accordance with the estimation rule in step (b) in dependence also on at least one of the image zone values. The quality of the prediction on the determination of the estimated pixel values can likewise be increased by the additional taking into account of such a comparison image. This embodiment, however, requires that the comparison image of reduced spatial resolution, i.e. the set of image zone values, is likewise compressed (and stored) so that the image zone values are equally available for the later decoding of the pixel values.

In a further development of this embodiment, such a set of image zone values can correspond to a comparison image of greatly reduced spatial resolution, with a respective comparison image of increased spatial resolution (in comparison with the preceding image) being generated by iterative estimation. The following steps can thus be provided for the determination of an estimated pixel value of the respective pixel in step (b):

determining an estimated intermediate image zone value in dependence on at least the pixel value of the predetermined other pixel and on the respective image zone value using the estimation rule, with the intermediate image zone value being associated with a smaller group of pixels than the image zone value;

optionally, repeating this step to determine estimated intermediate image zone values which are associated with a still smaller group of pixels than the previously determined intermediate image zone values; and determining the estimated pixel value of the respective pixel in dependence on at least the pixel value of the predetermined other pixel and on the respective intermediate image zone value while using the estimation rule.

In other words, in this further development, the original comparison image of reduced spatial resolution is used to predict an estimated intermediate image zone value, in turn while considering the pixel environment. The intermediate image zone values then correspond to an estimated comparison image of increased spatial resolution (in comparison with the original comparison image of reduced spatial resolution). These estimated intermediate image zone values are then additionally taken into account for the prediction of the estimated pixel value of the respective pixel. In this respect, the determination of the estimated intermediate image zone values can be repeated once or a multiple of times to increase the spatial resolution of the comparison image in each case. A particularly simple calculation results when in this process the spatial resolution is increased by the factor of 2 or 4 in each iteration step (binary gradated series).

In accordance with a further embodiment, the image data are moving image data of a moving image camera which correspond to a time sequence of image data sets. In this case, at least one respective pixel reference value, which corresponds to a pixel value of a preceding image data set of the time sequence, can be associated with the pixels in addition to the respective pixel value. In other words, the pixel reference values form an image which was generated laterally offset to the generation of the currently observed image. These pixel reference values can now additionally be taken into account to predict the respectively estimated pixel value in step (b). The quality of the prediction can hereby likewise be increased, with it being utilized that individual images in a sequence of moving images are frequently at least partly the same. In this case, an estimator (corresponding to the estimation rule used) can use the previously compressed or decompressed image as additional information. A further improvement of the prediction quality can be achieved in the determination of the estimated pixel values if a motion analysis is carried out. An attempt can be made for this purpose, for example, to estimate the global movement between the preceding image and the currently observed image and to use this information to take account of the correspondingly spatially offset image information of the preceding image in the prediction of the estimated pixel values.

In accordance with a further embodiment, the determination of the respective decoded pixel values in the named step (g) takes place during the decoding of the pixel value in dependence also on a respective predetermined noise value which is added (as a positive and/or negative value), for example, to the back-transformed difference value determined by using the difference value back transformation rule. This can take place before or after the offsetting of the back-transformed difference value with the reproduced estimated pixel value of the respective pixel. It is achieved by such an addition of artificial noise that the back-transformed difference values are distributed continuously or at least quasi-continuously despite the quantization which took place. So that the added noise does not, however, increase the total noise in the image, the respective noise value is also taken into account during the coding of the pixel values. For this purpose, the quantization takes place during the coding, that is the determination of the respective quantized difference value in step (d), in dependence also on the same respective predetermined noise value of the respective pixel. The respective predetermined noise value in step (d) can, for example, be added to the pixel value of the respective pixel (preferably with the opposite sign) before or after the estimated pixel value is subtracted to form the difference value of the respective pixel. The more favorable quantization stage, i.e. the next closest quantized difference value (while taking account of the noise value), can thus already be selected in the quantization to avoid an increase in the total noise in the image. The amplitude of the added noise value is preferably selected in accordance with the difference of adjacent quantization stages. The noise value can in particular adopt values which are symmetrically distributed about the value zero, with the interval between the positive amplitude and the negative amplitude of the noise value corresponding to the interval of adjacent quantized difference values.

To improve the efficiency of the compression of the quantized difference value in this embodiment, the respective predetermined noise value can also be used during the coding of the pixel values selectively to invert the quantized difference values. For this purpose, a check can be made whether the predetermined noise value has a positive sign or a negative sign, with the quantized difference value of the respective pixel only being inverted in one of these two cases before the quantized difference value is compressed. In other words, in dependence on the sign of the respective predetermined noise value, the sign of the quantized difference value of the respective pixel is preferably changed (from positive to negative or from negative to positive) in step (d) before the compression. This sign change is reversed again in the later decoding, preferably before or in the step (g) (the sign of the respective noise value is also already known in the decoding). By a temporary changing of the sign of the quantized difference values of this kind, however, a degradation of the compression is countered which can result from a widening of the distribution of the quantized difference values due to the addition of the artificial noise values.

Alternatively or additionally, a taking into account of artificial noise values is also possible in the case that the respective pixel value is quantized in step (a) (in accordance with the brightness value quantization rule, as explained above) on the coding of the pixel values before the forming of the difference value of the respective pixel. In this case, the quantization of the pixel value of the respective pixel can likewise take place in a corresponding manner in dependence on a respective predetermined noise value of the respective pixel, with the determination of the decoded pixel value of the respective pixel taking place during the decoding of the pixel values in step (g) in dependence also on this predetermined noise value of the respective pixel. The respective noise value can in particular be added to the determined decoded pixel value in the decoding (as a positive value and/or a negative value), while the predetermined noise value is added to the respective pixel value before the quantization of the pixel value with reversed sign. It is also hereby achieved that the decoded pixel values are distributed continuously or at least quasi-continuously despite the quantization which has taken place. The noise values used in this embodiment naturally do not necessarily have to correspond to the noise values which are used in the above-explained quantization of the difference values.

The artificially added noise can impair the efficiency of the compression of the index difference values following the coding in the last-named embodiment since the difference between the prediction of the estimator (estimated pixel value) and the actual pixel value is increased by the noise. This is due to the fact that, on the quantization of the pixel values during the coding—as explained—an index value is selected which does not necessarily (i.e. in accordance with the brightness value quantization rule) correspond to the respective pixel value (but only while taking account of the predetermined noise value). This modified index value is, however, used as the basis for the formation of the index difference value in step (d). Since, however, the value of the added noise is known and this noise is related to the determined index values, the influence of the added noise on the formed index difference values can in turn be predicted with the aid of a second estimator. For this purpose, an estimator is used which receives as input values the index different values formed in the coding in accordance with step (d) as well as the respective value of the added noise. The estimator delivers from this a so-called noise-compensation value which corresponds to a prediction on the influence of the added noise to the respective index difference value. This noise compensation value is subtracted from the respective index difference value, whereby the index difference values become smaller overall and the efficiency of the following compression of the index difference values is improved.

In the two aforesaid embodiments with a taking into account of artificial noise values for the difference value quantization or for the brightness value quantization, the respective noise values of the difference pixels have to be varied. A sequence of predetermined noise values can be used for this purpose. So that the same sequence of predetermined noise values can be used in the coding of the pixel values as in the decoding, it is preferred if the noise values correspond to a sequence of random numbers which is generated by means of a pseudo-random generator, with this pseudo-random generator being available both in the coding and in the decoding. The pseudo-random generator can in this respect work with a fixed start value so that this start value is known in advance both in the coding and in the decoding. Preferably, however, a random start value is generated in the coding and this start value is additionally stored in the compressed image (i.e. with the image data). A sequence of random numbers starting with a different start value is thus used in each image, whereby the noise at a respective pixel is cancelled out in a sequence of mutually following images.

As regards the distribution of the artificial noise values in the aforesaid embodiments, it is advantageous if the relative frequency of the noise values corresponds to a triangular distribution function which has its maximum at the value zero. Such a distribution function can be achieved in a simple manner in that two independent random numbers are calculated which lie in an interval from zero to a value MAX, with these two random numbers then being subtracted from one another. The difference of the two random values is then in the interval −MAX to +MAX and has the desired triangular distribution. The parameter MAX is advantageously selected so that it just has the magnitude of a quantization step (e.g. interval of adjacent quantized difference values).

In the method in accordance with the invention, the pixels are coded and decoded in accordance with a specific order of the pixels. The arrangement of the other pixel taken into account in the estimation step (e) (or of the plurality of the pixels) is preferably selected so that the pixel value has already been decoded in accordance with the named specific order for this other pixel (or for this plurality of other pixels) when the reproduced estimated pixel value of the respective pixel is determined. In other words, it is ensured by the specific order that the decoding of the pixels can be based on image portions with respect to which the pixel values have already been decoded.

So that decoding can take place in accordance with the named specific order, it is necessary to work with replacement values for a specific image zone. Some of the pixel values are therefore not coded or not completely coded and these pixel values serve as a respective replacement value for the named previously decoded pixel value in the determination of the reproduced estimated pixel value in the estimation step (e). This making use of replacement values can in particular be provided for one or more start rows and/or for one or more marginal columns of the image.

In accordance with a further embodiment, the pixel values of a plurality of different pixels are simultaneously coded. If the coding takes place in parallel for a plurality of pixel values of an image or even of an image row by means of a plurality of processing units, the compression of the image data can take place particularly fast. The individual processing units can in this respect even work with a relatively low speed, whereby a comparatively small power loss results overall which increases disproportionately with the clock rate in electronic circuits. Such a coding of a plurality of pixel values simultaneously is possible particularly simply when the estimators used are designed so that only pixels are taken into account which have already previously been processed by the respective processing unit.

In accordance with a further embodiment, the image data form a so-called RGB image and include pixel values of a first color (e.g. green), pixel values of a second color (e.g. red), and pixel values of a third color (e.g. blue). The pixel values of the second color are preferably modified in dependence on the pixel values of the first color before the pixel values of the second color are coded. In a corresponding manner, the pixel values of the third color are preferably modified in dependence on the pixel values of the first color before the pixel values of the third color are coded. The correlation between different color channels can hereby be utilized. The estimator—i.e. the processing unit which predicts an estimated pixel value in accordance with the estimation step (b)—then works on the basis of the results of the offsetting of the second or third channels with the first channel, with, as with the first channel, in accordance with step (d) a difference value is formed which is quantized and subsequently compressed. The named modification of the pixel value can, for example, be the formation of a difference or of a quotient.

If the image data are raw data of an electronic camera (so-called RAW image), only one single piece of color information is present at each image location. It is also of advantage in this case to start with a first color channel and to compress the corresponding pixel values (in particular green channel). The pixel values of the respective color channel are, however, also used to acquire an estimation of the respective brightness value of the respective color at the image points at which only information on the other color channel is present (interpolation of the pixel values of the adjacent pixels of the same color). As explained, the second color channel and the third color channel can then be offset with the first color channel, for example by formation of a difference or of a quotient.

The invention also generally relates to a method of coding and decoding image data which include a plurality of pixels, with each pixel being able to adopt a plurality of pixel values, with a respective estimation value being determined in dependence on the pixel value of at least one predetermined other pixel while using an estimation rule for the coding of the pixel value of a respective pixel, with a difference value of the respective fixed being formed in dependence on the estimation value and on the actual pixel value, and with a respective reproduced estimation value being determined in dependence on at least one previously decoded pixel value of the predetermined other pixel while using the estimation rule for decoding the pixel value of the respective pixel, with the reproduced estimation value being offset with the difference value of the respective pixel to determine a decoded pixel value of the respective pixel. As explained above, the data quantity to be compressed (after the coding) can be substantially reduced by such a method, while a good image quality is reached despite a small calculation effort.

In such a method, the pixels can be provided in an arrangement of a plurality of rows, with the pixel values being coded in accordance with a row order such that pixel values of the respective third-next row and pixel values of the respective preceding row are alternately coded, with the determination of the estimation value of the respective pixel taking place in dependence on the pixel value of at least one predetermined other pixel which is arranged in the row pre-preceding it for the coding of pixel values of the named respective third-next row, and with the determination of the estimation value of the respective pixel taking place in dependence on the respective pixel value of a plurality of predetermined other pixels which are arranged in the row preceding it and in the row next to it, as explained above, for the coding of pixel values of the named respective preceding row. The estimation value is preferably determined within the respective row only for every second pixel, with the estimation value being determined for the remaining pixels independently of the named row order in dependence on the respective pixel value of four directly adjacent pixels which have already been coded (and preferably decoded).

In such a method, alternatively or additionally, at least one set of image zone values can be generated before the coding of the pixel values in dependence on the pixel values, with each image zone value being associated with a group of pixels so that the image zone values correspond to an image of reduced spatial resolution, with the determination of the estimation value of the respective pixel taking place in accordance with the at least one estimation rule also in dependence on at least one of the image zone values. As explained above, in this respect in particular the determination of the estimation value of the respective pixel can include the following steps:

determining an estimated intermediate image zone value in dependence on at least the pixel value of the predetermined other pixel and on the respective image zone value using the at least one estimation rule, with the intermediate image zone value being associated with a smaller group of pixels than the image zone value; and determining the estimation value of the respective pixel in dependence on at least the pixel value of the predetermined other pixel and on the respective intermediate image zone value while using the at least one estimation rule.

The invention further generally relates to a method of lossy compression of image data which include a plurality of pixels, with each pixel being able to adopt a plurality of pixel values, with a quantization of the pixel values being carried out for at least some of the pixels (that is a determination of index values), with larger pixel values being quantized more coarsely than relatively small pixel values, and with the quantized pixel values being compressed in accordance with a compression rule. As explained above, a noise optimization of the quantization is hereby achieved, in particular for image data which have been generated by an electronic camera. In this case, the pixel values to be quantized can be brightness values or also difference values of the above-explained kind (relation between pixel value and estimated pixel value).

The invention further generally relates to a method of compressing image data which were generated by means of an electronic image sensor and which include a plurality of pixels, with each pixel being able to adopt a plurality of pixel values e.g. respective brightness value, or difference value as a result of a comparison with an estimated value, or modified brightness value or difference value). In this method, a quantization of the pixel values is carried out for at least some of the pixels while using at least one quantization rule (e.g. brightness value quantization rule or difference value quantization rule), with the quantized pixel values being compressed in accordance with a compression rule, and with a quantization error being determined for the respective pixel, with the quantization error being taken into account for the later quantization of the pixel value of at least one other pixel, as was explained above.

In this method, the quantization error can be determined in that the quantized pixel value of the respective pixel is back-transformed while using a back-transformation rule (e.g. brightness value back transformation rule or difference value back transformation rule) which corresponds to a reversal of the named quantization rule and in that the respective difference between the back-transformed pixel value and the original pixel value is formed. The quantization error determined for the respective pixel can be used to influence the later quantization of the pixel value of at least one other pixel such that a sum of the quantization errors for the plurality of pixel values does not grow or does not exceed a predetermined limit value. For example, the quantization error determined for the respective pixel is taken into account for the later quantization of the pixel value of at least one other pixel such that the quantization error is partly or fully added to the pixel value of the respective other pixel or is subtracted from the pixel value before or while the named quantization rule is applied to this pixel value. Alternatively to this, the quantization error determined for the respective pixel can be taken into account for the later quantization of the pixel value of at least one other pixel such that a quantization correction is carried out for the quantized pixel value of the respective other pixel after the named quantization rule has been applied to this respective other pixel value.

Alternatively or additionally, in this method, the pixels can be provided in an arrangement of a plurality of rows and columns, with the columns being associated with a plurality of column groups of which each includes a plurality of columns, with the pixel values within each column group being coded row-wise and the pixel values of the different column groups being coded in parallel, with, after reaching a respective row end in one of the plurality of column groups, a quantization error determined in this column group being used for the coding of the respective row or of a following row in at least one adjacent column group as was explained above.

The invention furthermore generally relates to a method of coding and decoding image data which include a plurality of pixels, with each pixel being able to adopt a plurality of pixel vales, with a quantization of the pixel values being carried out during the coding for at least some of the pixels, with the quantization taking place in dependence on a predetermined noise value of the respective pixel, and with the determination of a back-transformed pixel value of the respective pixel also taking place during the decoding in dependence on the predetermined noise value of the respective pixel. As explained above, a continuous distribution of the back-transformed pixel values is hereby achieved despite the quantization of the pixel values. In this case, the pixel values to be quantized can also be brightness values or difference values of the above-explained kind (relation between pixel value and estimated pixel value).

In this method, the predetermined noise value can be added to the pixel value during the coding in order hereby to be able to select a next closest quantization stage on the quantization of the respective pixel value, with the predetermined noise value being added to the back-transformed pixel value of the respective pixel with a reversed sign during the decoding, as was explained above. Alternatively or additionally, the sign of the respective quantized pixel value can be changed in dependence on the sign of the predetermined noise value during the coding before a following compression of the quantized pixel values, with the sign of the respective decompressed quantized pixel value again being changed in dependence on the sign of the predetermined noise value after a decompression of the quantized pixel values during the decoding, i.e. the sign change is reversed before the back-transformation of the respective pixel values, as was explained above. The predetermined noise value is preferably generated by means of a pseudo-random generator.

The invention will be explained in the following only by way of example with reference to the drawings.

FIG. 11 shows a flowchart for the coding of a plurality of rows of pixels;

FIG. 12 shows a further flowchart for the coding of a plurality of rows of pixels;

Figure 1:
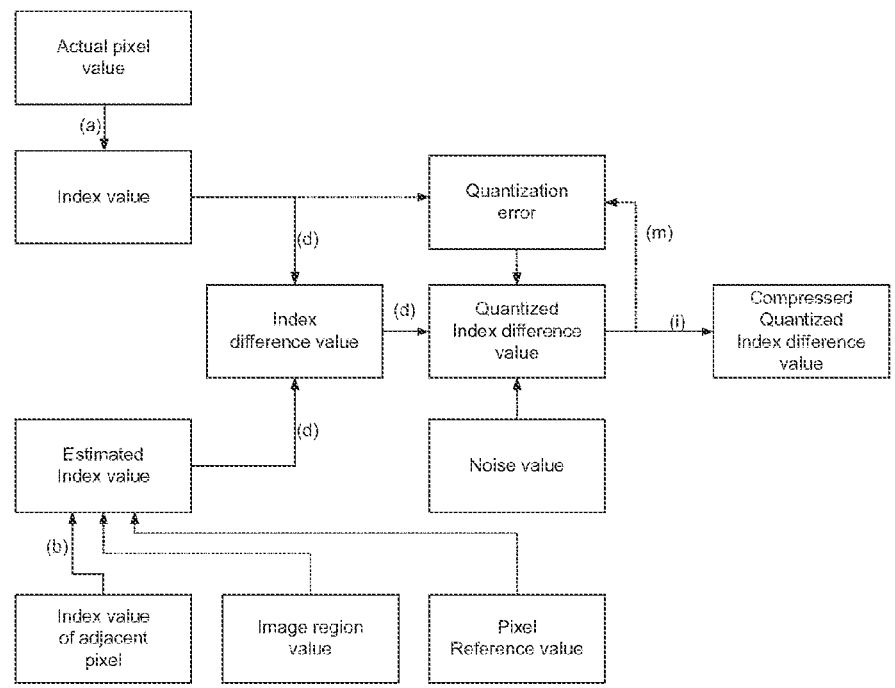
FIG. 1 shows a schematic representation of a compression process.

Different steps of a method of compressing image data which include a plurality of pixel values is shown in FIG. 1. In an optional step (a), a respective so-called index value is determined using the actual pixel values of the different pixels. This is done by means of a predetermined brightness value quantization rule and corresponds to a quantization of the respective actual pixel value.

In a step (b), an estimated pixel value for the pixel is determined in accordance with step (a) in dependence on the pixel value of a predetermined other pixel. This corresponds to a prediction of a pixel value while taking account of the pixel environment, with this prediction being carried out while using a predetermined estimation rule. If work is carried out in accordance with step (a) with quantized pixel values (i.e. index values), the estimated pixel value in accordance with step (b) is likewise a quantized value (i.e. an estimated index value), with the same brightness value quantization rule being used as in step (a). In this case, the prediction is likewise based on the quantized pixel value (i.e. index value) of the named other pixel.

The step (b) is generally carried out for those pixels for which the pixel value of the respective predetermined other pixel has already been coded or a suitable replacement value is present. The named pixel value of the predetermined other pixel for the estimation in accordance with step (b) is preferably a value which has been determined from a coding and decoding which has already previously taken place. In other words, the estimation of the respected pixel value should take place on the coding of the pixel values in dependence on pixel values which were already previously coded and decoded again. This namely also corresponds to the conditions which are present during the following decoding in the estimation (step (e) in FIG. 2).

The difference is formed in a step (d) between the index value in accordance with step (a) and the estimated index value in accordance with step (b) to determine a so-called index difference value (difference value of the quantized pixel values). Furthermore, the respective index difference value is also quantized in accordance with a predetermined difference value quantization rule to form a quantized index difference value. This further quantization can take place, for example, by use of a suitable look-up table together with the images of the index difference value.

The quantized index difference values thus determined are compressed in a step (i) in accordance with a known process, preferably in a loss-free manner, to obtain a respective compressed quantized index difference value. The compressed quantized index difference values can then be stored.

A substantial reduction in the data quantity which subsequently has to be compressed in step (i) is already achieved within the framework of the coding in accordance with the steps (a), (b) and (d) due to the preparation of a prediction of estimated pixel values while taking account of the respective pixel environment in accordance with step (b) and due to the formation of a difference value in accordance with step (d). A significant additional reduction in the data quantity is achieved in that the index different values are quantized in step (d).

Figure 3:
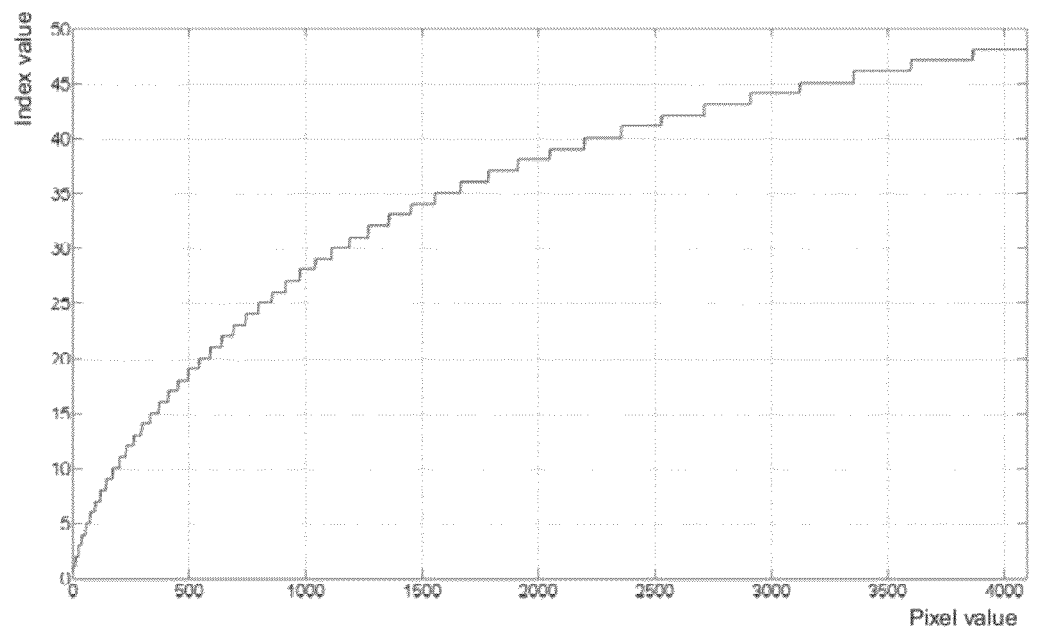
FIG. 3 shows a quantization instruction for pixel values.
Figure 4:
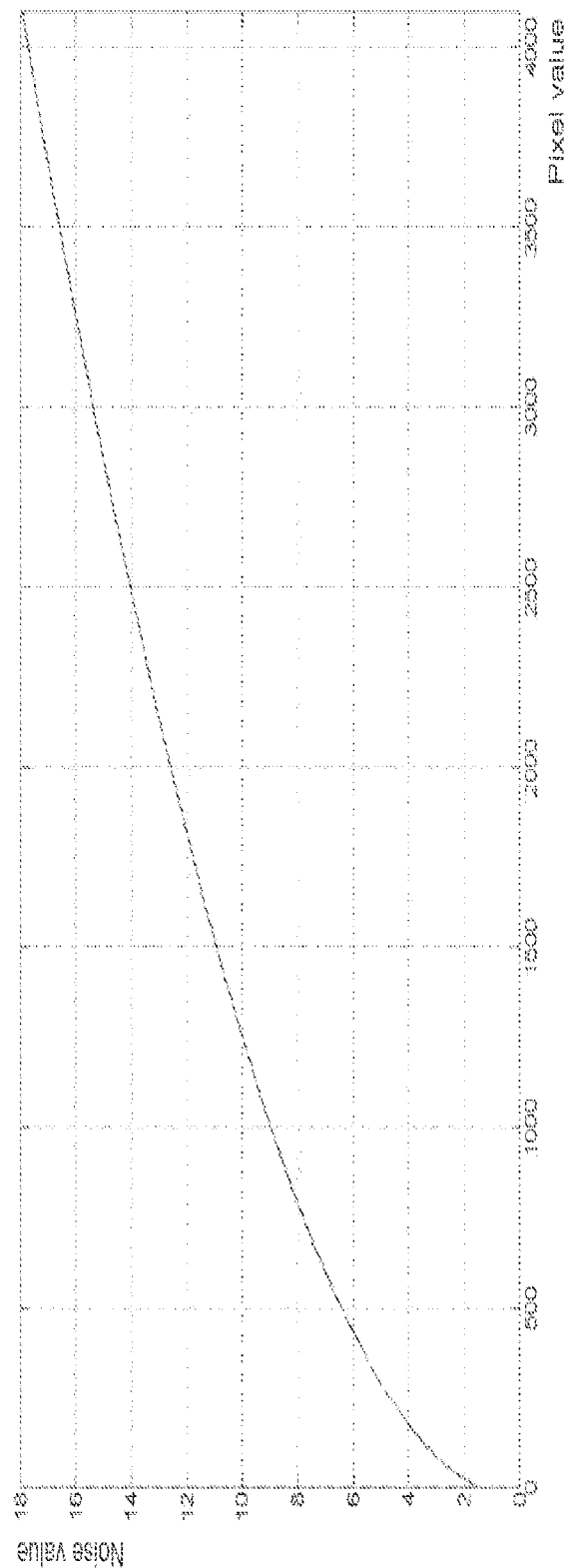
FIG. 4 shows the noise in dependence on the brightness.

A possible quantization instruction which corresponds to the brightness value quantization rule in accordance with step (a) is illustrated in FIG. 3. The index values (in accordance with the quantization stages) are shown in dependence on the pixel values (in accordance with the brightness). The brightness quantization rule here corresponds to a root stage function which reproduces the dependence of the noise on the brightness in the image data of an electronic image sensor. This dependence is shown in FIG. 4. Since the used brightness value quantization rule is selected such that larger pixel values (at the right in FIG. 3) are quantized more coarsely than relatively smaller pixel values (at the left in FIG. 3), the quantization of the pixel values is adapted to the noise contained in the image so that the quantization is carried out less easily in the decoded image.

It must, however, be noted that a quantization of the pixel value in accordance with steps (a) and (b) is not absolutely necessary or can already be carried out before the explained coding. In this case, in the named step (d), a difference value is formed and quantized in dependence on the present pixel values (actual pixel value and estimated pixel value).

Figure 5:
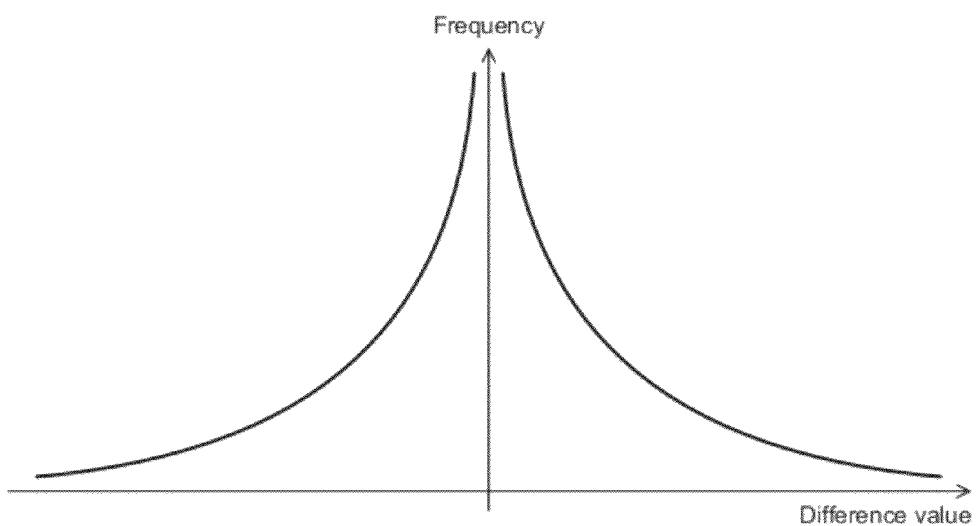
FIG. 5 shows a frequency distribution of difference values.
Figure 6:
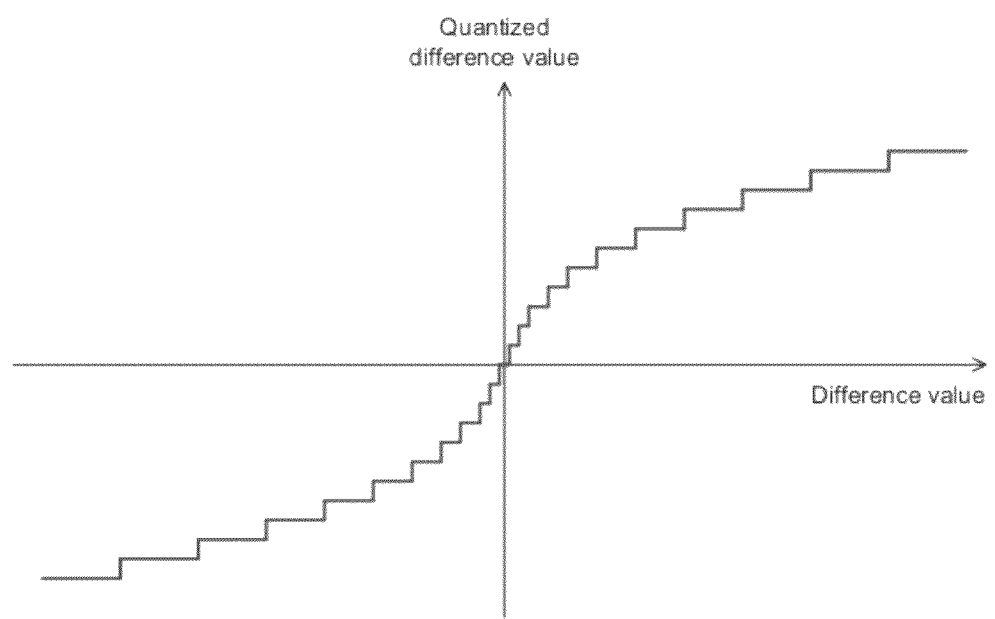
FIG. 6 shows a quantization instruction for difference values.

The particular advantage of the quantization of the index difference values (or only of the above-named difference values) will be explained in the following with reference to FIGS. 5 and 6. FIG. 5 shows a typical frequency distribution of the formed difference values. This frequency distribution is similar to a 1/x function (inverted for negative values). Difference values large in amount therefore have a much smaller frequency than difference values relatively smaller in amount. This circumstance is utilized for a difference value quantization rule such as is illustrated as a stage function in FIG. 6. In accordance with the difference value quantization rule used, difference values with larger absolute amounts are quantized more coarsely than difference values with relatively smaller absolute amounts. A loss of information hereby only takes place in those image zones in which anyway only a small proportion of the total image information is present and in which the image information is anyway only difficult to predict. The quantization of the difference values in accordance with step (d) is thus ultimately not perceptible or hardly perceptible and a significant reduction in the data quantity is nevertheless achieved. Alternatively to such a non-linear quantization, the difference value quantization rule can, however, also correspond to a linear stage function.

Figure 2:
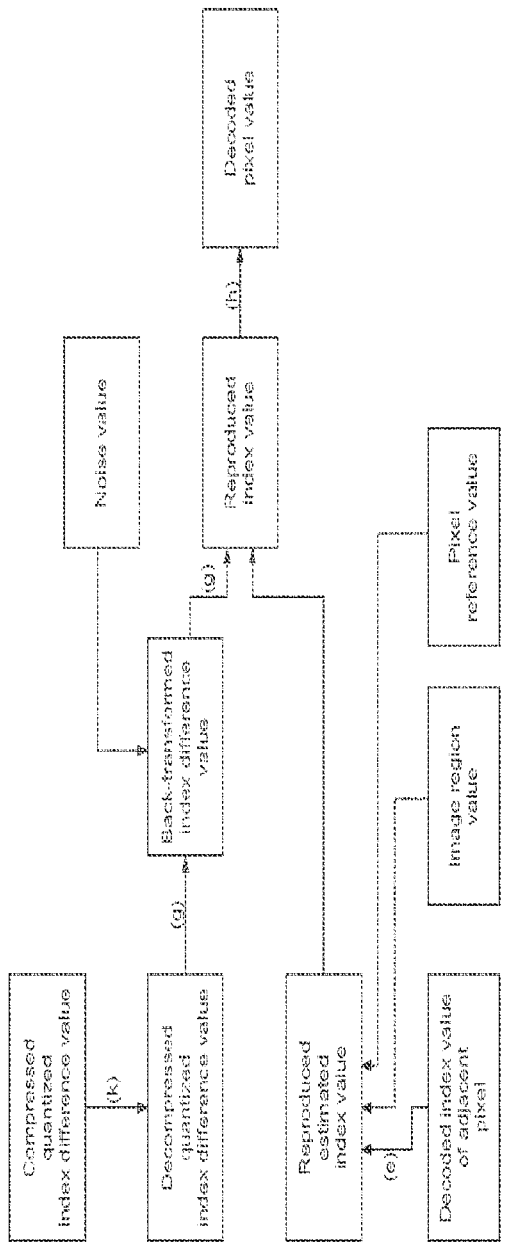
FIG. 2 shows a schematic representation of a decompression process.

In FIG. 2, a flowchart of a decompression process in accordance with FIG. 1 is shown, with steps carried out within the framework of the compression being substantially reproduced or inverted.

Corresponding to the estimation step (b) in accordance with FIG. 1, a reproduced estimated pixel value is determined in a step (e) in dependence on a previously already decoded pixel value of another pixel (with the same spatial association as in step (b)). If work is carried out in the coding in accordance with step (a) in FIG. 1 with quantized pixel values (i.e. index values), the reproduced estimated pixel value in accordance with step (e) is in turn a quantized value (i.e. a reproduced estimated index value).

Furthermore, in a step (k), the compressed quantized index difference value obtained by the compression in accordance with FIG. 1 is decompressed.

The decompressed quantized index difference value thus obtained is first back-transformed in a step (g) in accordance with a difference value back-transformation rule which corresponds to a reversal of the difference value quantization rule used in the coding in accordance with FIG. 1.

The respective back-transformed index difference value is then offset with the reproduced estimated index value in accordance with step (e) (for example by addition) to obtain a reproduced index value which corresponds to the index value obtained by step (a) in accordance with FIG. 1.

A back-transformation takes place for this reproduced index value in a step (b) while using a brightness value back-transformation rule which corresponds to a reversal of the previously used brightness value quantization rule. As a result, a decoded pixel value for the respective pixel is present.

If the quantization step (a) in FIG. 1 is omitted as explained, the back-transformation in FIG. 2 in accordance with step (h) is also omitted, i.e. the reproduced value in accordance with step (g) is already the decoded pixel value.

In FIGS. 1 and 2, advantageous further developments of the explained compression process and decompression process are also shown. For example, the prediction of the respective estimated pixel value in accordance with step (b) can additionally be based on an image zone value which is associated with a comparison image of reduced spatial resolution. The quality of the prediction can hereby be improved. However, this comparison image must likewise be compressed and stored so that the respective image zone value is also available in the decompression in accordance with FIG. 2 and in the determination of the reproduced estimated pixel value in accordance with step (e).

In accordance with a further advantageous further development, the prediction of the respective estimated pixel values in step (b) in accordance with FIG. 1 can be based on a pixel reference value which corresponds, in the case of moving image data, to a preceding image, i.e. to an already coded and decoded image. If such a pixel reference value is taken into account in the determination of the estimated pixel value during the compression, the pixel reference value must also be available (in decoded form) in the decompression in accordance with FIG. 2.

It is particularly advantageous if the back-transformed index difference value obtained in the decompression in accordance with FIG. 2 is offset with a predetermined noise value, in particular in that the respective predetermined noise value is added in step (g) to the back-transformed index difference value of the respective pixel. A continuous or quasi-continuous distribution of the back-transformed index difference values can hereby be achieved. So that the addition of such noise values does not increase the total noise in the image, the respective noise value can already be taken into account in the compression in accordance with FIG. 1, in particular to be able to select the most favorable quantization stage in the quantization of the respective index difference value in accordance with step (d), i.e. that quantization stage which is closest to the resulting index difference value on the addition of the respective noise value. For this purpose, in step (d), the respective predetermined noise value can be added to the index difference value of the respective pixel, with this being done with reversed sign with respect to step (g). So that the respective noise value is known in the compression in accordance with FIG. 1 and in the decompression in accordance with FIG. 2, the noise values can be generated on the basis of a predetermined sequence of random numbers which is generated by means of a pseudo-random generator, with the start value being known both in the compression and in the decompression.

To improve the efficiency of the compression of the quantized index difference values on such an addition of artificial noise values, the respective predetermined noise value can also be used during the coding of the pixel values in accordance with FIG. 1 selectively to invert the quantized index difference values before the compression. A check is made for this purpose whether the respective predetermined noise value has a positive sign or a negative sign, with the sign of the quantized index difference value only being changed in one of these two cases (e.g. with a negative sign of the noise value), in particular in step (d) in accordance with FIG. 1. This change of the sign is later reversed in the later decoding after the decompression in accordance with FIG. 2 in step (g) so that no information is lost by the temporary sign change. However, the efficiency of the compression of the quantized index difference values is improved in step (i) in accordance with FIG. 1 by the temporary sign change of the quantized index difference values since the mean deviation of the quantized index difference values is reduced by their mean value.

Figure 7A:
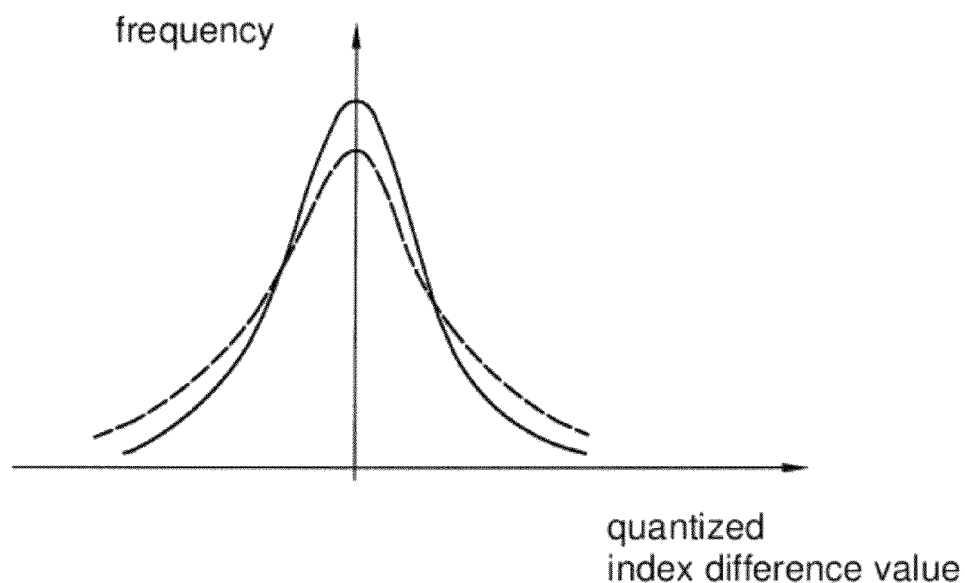
FIGS. 7a and 7b show frequency distributions of quantized index difference values.
Figure 7B:
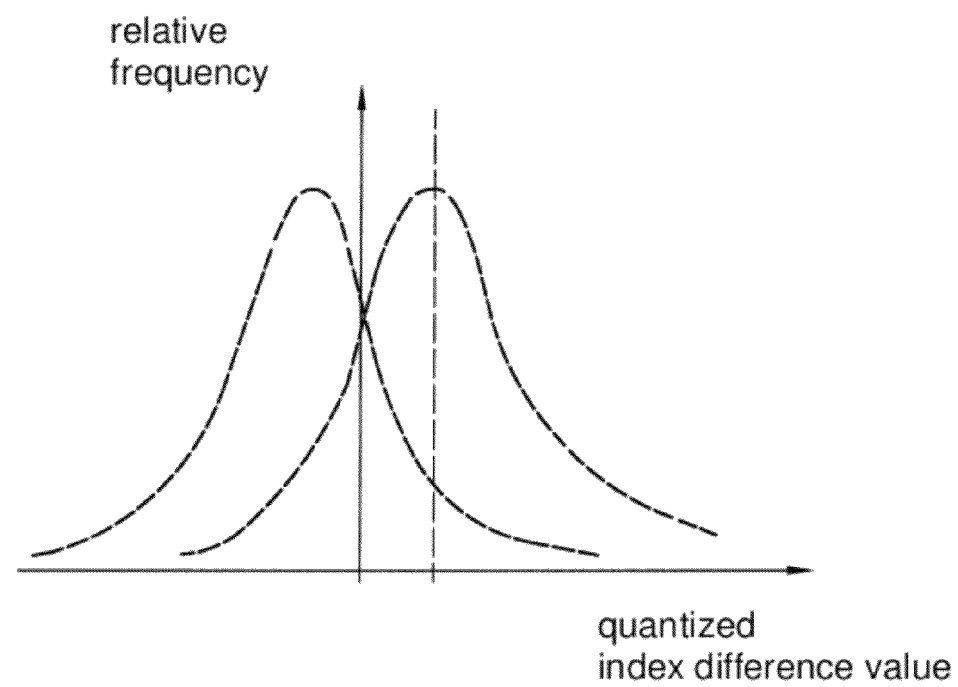

This is illustrated by way of example in FIGS. 7a and 7b. FIG. 7a shows a typical frequency distribution of the quantized index difference values by a mean value of zero without taking account of artificial noise values (solid curve).). If artificial noise values which can arbitrarily have a positive or a negative sign is added to the index difference values before the quantization, this effects a widening of the frequency distribution (dashed curve in FIG. 7a). This widened frequency distribution ultimately corresponds to a superimposition of the frequency of the quantized index difference values which are based on a negative noise value and of the frequency distribution of the quantized index difference values which are based on a positive noise value. This is shown (with an adapted scale of the ordinate) in FIG. 7b (dashed left hand curve or dashed right hand curve). If now those quantized index differenced values for which a negative predetermined noise value was considered receive a reversed sign before the compression, this corresponds to a folding over of the left hand curve of FIG. 7b with respect to the ordinate, i.e. onto the right hand curve of FIG. 7b. A relatively narrow frequency distribution is again reached (in accordance with the solid curve in FIG. 7a); however, with a displaced mean value (dashed vertical line in FIG. 7b).

In accordance with a further advantageous further development, after the quantization of the respective index difference value has been carried out in accordance with step (d) in FIG. 1, a quantization error for the respective pixel can be determined in a step (m), with this quantization error being taken into account for the following quantization of the index difference value of at least one other (in particular adjacent) pixel in accordance with step (d). The quantization error is preferably determined in that the quantized index difference value of the respective pixel determined in accordance with FIG. 1 is back-transformed again while using the already named difference value back-transformation rule which corresponds to a reversal of the difference value quantization rule, with the difference between the back-transformed index difference value and the original index difference value being formed. The respective determined quantization error is preferably used to influence the determination of the quantized index difference value in accordance with the difference value quantization rule in step (d) for another pixel so that the sum of the quantization errors does not increase excessively, e.g. does not exceed a predetermined threshold value. For this purpose, that quantization stage (quantized index difference value) is selected for the other pixel which is closest to the sum of the respective index difference value and the determined quantization error (or a part thereof).

Figure 8:
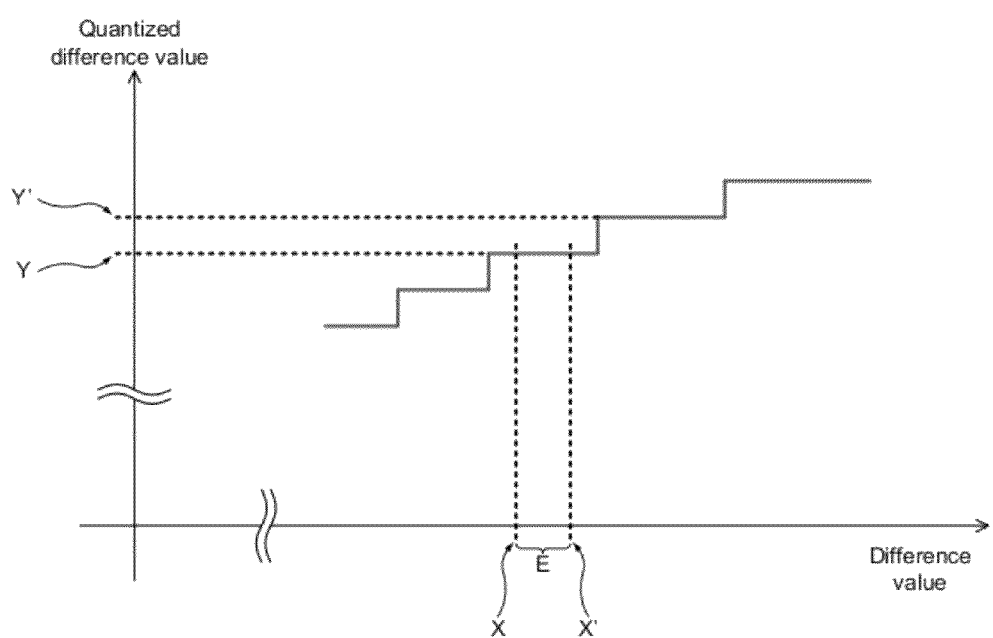
FIG. 8 shows a detailed view of a quantization instruction.

A possible consideration of the quantization error will subsequently be explained in the following with reference to FIGS. 8 and 9. FIG. 8 shows a detailed view of a quantization instruction which is in turn shown as a stage function. Let it be assumed that the difference value (in particular the aforesaid index difference value) of the respective pixel amounts to X, which would result in a quantized difference value Y in accordance with the difference value quantization rule. If, however, a quantization error E was previously determined and is added to the difference value X before the quantization thereof, a modified difference value X' results. The value Y' is identified for this in accordance with the quantization rule as a more suitable (i.e. closer) quantized difference value.

Instead of such a consideration of the quantization error before the quantization of the difference value, the quantization error can also be taken into account after the quantization of the difference value, for example in that the quantized difference value is subsequently increased or decreased by a unit in dependence on the determined quantization error (quantization correction). In this case, the quantization error E still has be to converted into the dimension of the index values (by a corresponding application of the difference value quantization rule).

Figure 9:
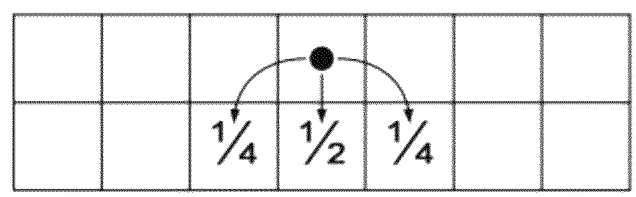
FIG. 9 shows a possible taking into account of a determined quantization error.

As is shown in FIG. 9, the respective quantization error E can also be distributed with different weighting over a plurality of adjacent pixels (here: 1/4, 1/2, 1/4) to effect a modification of the quantization rule for the respective pixel in the explained manner.

Such a determination and consideration of a quantization error cannot only be provided for the quantization of the difference values or index difference values in accordance with step (d), but also alternatively or additionally, in an analog procedure, for the quantization of the actual pixel values in accordance with step (a).

Figure 10:
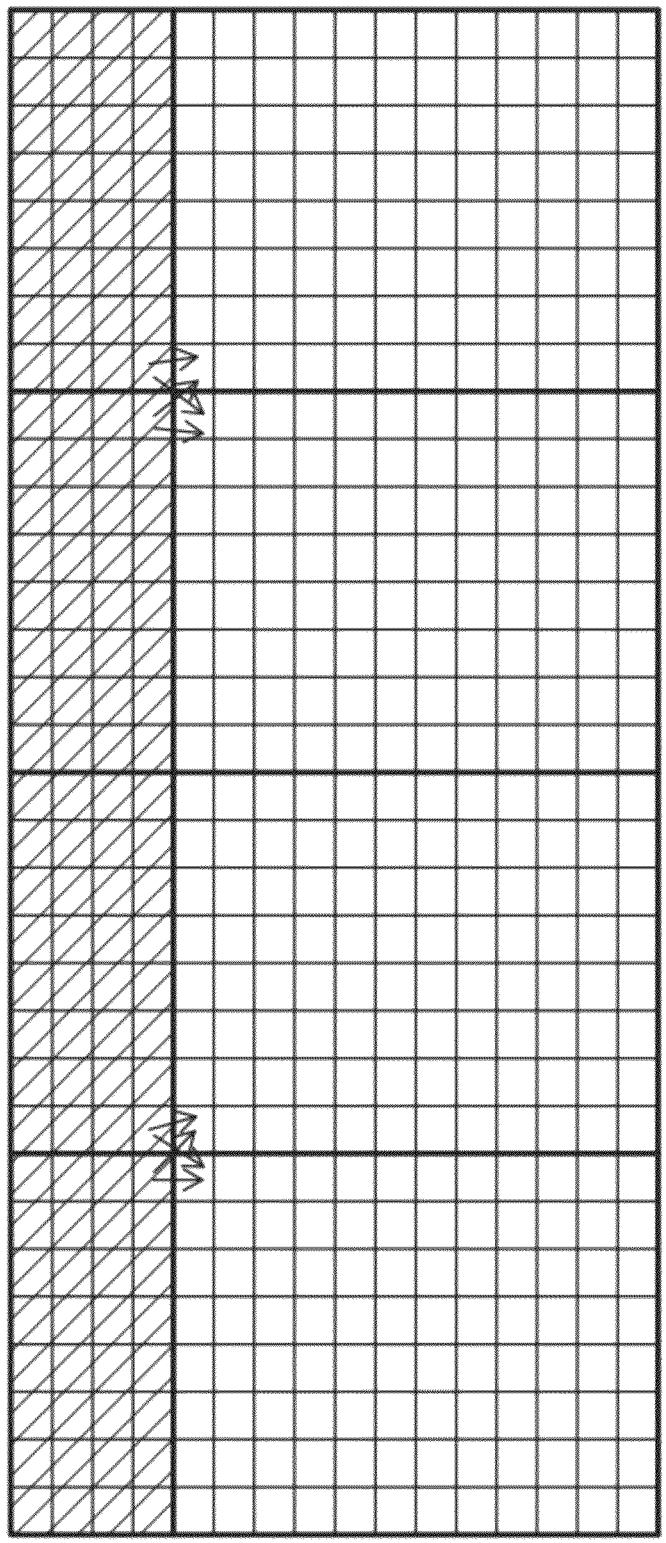
FIG. 10 shows a possible taking into account of a determined quantization error on a division of the pixels into column groups.

FIG. 10 shows a possible taking into account of a determined quantization error on a division of the pixels into column groups. In the example shown, the pixels are arranged in 16 rows and 32 columns, with the columns being associated with four column groups of which each includes eight columns. The pixel values are coded row-wise within each column group in the above-explained manner, with the pixel values of the different column groups being coded in parallel, whereby the coding can take place particularly fast. The first four rows of each column group are already coded in the example shown. To consider a determined quantization error as effectively as possible, the quantization error determined in the respective column group is forwarded to an adjacent column group after reaching a respective row end (here the end of the fourth row in each column group) so that the quantization error is also used there for the coding of the following row. In addition, the respective quantization error is also used in the respective separate column group for the coding of the following row. The forwarding of the quantization error is shown by a respective arrow in FIG. 10. In the example shown, the respective quantization error is exchanged between the first and second column groups and between the third and fourth column groups. It is alternatively also possible, for example, that (with the exception of the right hand column group) each column group forwards the respective quantization error to the column group adjacent to the right.

FIG. 11 illustrates a particularly advantageous order of the coding of different rows in which the pixels are arranged. The pixel values are here coded row-wise such that pixel values of the respective third-next row and pixel values of the respecting preceding row are alternately coded, with the required adaptations naturally being able to be provided at the image margins. For example, starting from row 1, the row 3 (=exceptionally the next-but-one row due to image margin) is coded first, then, however, the row 2 (=preceding row), then the row 5 (=third-next row), then row 4 (=preceding row), then row 7 (=third-next row), and so on and so on now. For the coding of a respective third-next row, row 7, for example, the prediction of the estimated pixel value of a respective pixel of this row is done in dependence on pixel values of the row pre-preceding it (=row 5). At this time, only the rows 1 to 5 are namely already coded, but not the rows 6 or 8. For the coding of a respective preceding row, row 6, for example, the prediction of the estimated pixel value of a respective pixel of this row is done in dependence on pixel values of the row preceding it (=row 5) and the row next to it (=row 7). At this time, only the directly adjacent rows (rows 5 and 7) are namely already coded. Pixel values from rows lying even further back can naturally also be taken into account since the rows 1 to 4 have already been coded at this time.

FIG. 12 illustrates an advantageous further development of the selection concept in accordance with FIG. 11. Some of the pixel values are here also coded row-wise in accordance with the explained row order so that pixel values of the respective third-next row and pixel values of the respective preceding row are alternately coded, with adaptations being carried out at the image margins. This row order is shown, analog to FIG. 11, in the left hand diagram of FIG. 12.

The right hand diagram of FIG. 12 additionally shows the order of the coding of the pixel values within the respective row. Provision is made for this purpose that the estimated pixel value is only determined for every second pixel within the respective row, with the estimated pixel value later being determined for the remaining pixels in dependence on the respective pixel value of four directly adjacent pixels which have already been coded and decoded again. For example, only the pixel values of the pixels of the odd number columns are first coded in row 1 and then in row 3 (reference numerals 1 to 12 in the right hand diagram of FIG. 12). Then in row 2 (=preceding row), the pixel values of the pixels of the even number columns are coded (reference numerals 13 to 18). For this purpose, the estimated pixel value of the respective pixel is determined in dependence on the respective pixel value of the four diagonally adjacent pixels. For example, the estimated pixel value of pixel 14 in row 2 is determined in dependence on the respective pixel value of pixels 2, 3, 8 and 9 in rows 1 and 3. The respective pixel value of the four diagonally adjacent pixels is previously coded and decoded again for this purpose so that the same information is used for the determination of the estimated pixel value of the respective pixel which is also available in the later decoding. Then in row 5 (=third-next row), the pixel values of the pixels of the odd number columns are coded (reference numerals 19 to 24). For this purpose, the estimated pixel value of the respective pixel is determined in dependence on the pixel value of the pixel which is arranged in the same column in the pre-preceding row. For example, the estimated pixel value of pixel 20 in row 5 is determined in dependence on the pixel value of pixel 8 in row 3. This coding order is continued until a pattern of coded pixels is formed in which (apart from the image margins), from the view of each coded pixel, the four diagonally adjacent pixels have likewise already been coded (marked by a respective numeral in FIG. 12) and the four directly adjacent pixels have not yet been coded (marked by "x" in FIG. 12). The image data preferably include pixel values of the colors red, green and blue in a color image or RAW image, with the pixel values thus coded being those of the green channel.

The remaining pixels, that is the pixels marked by "x" in FIG. 12 (e.g. colors red and blue), are coded in dependence on at least the pixel values of the already coded pixels (color green), with the above-explained row order not necessarily having to be observed. It is only important that the respective estimated pixel value is now determined in dependence on the respective pixel value of the four directly adjacent pixels. For example, the estimated pixel value of the pixel which is arranged in row 3 between the pixels 8, 9, 14 and 26 is determined at least in dependence on the respective pixel value of these four pixels 8, 9, 14 and 26. In order not to accumulate any estimation error in this process, it is important that the pixel values of the respective four directly adjacent pixels (e.g. pixels 8, 9, 14 and 26) have previously already been coded and decoded again.

In the above-explained embodiment, further dependencies can additionally be considered. For example, with a color image or RAW image, a mean value of the coded pixel values and the pixel values decoded again of the respective four directly adjacent pixels (color green) are formed, in accordance with an interpolation, for each of the named remaining pixels (i.e. for the not yet coded pixels of the color red or blue). This mean value is offset with the actual pixel value of the respective pixel (color red or blue) before it is coded so that the respective estimation is carried out using modified pixel values of the color red or blue. It is of advantage in this respect that the green channel is most similar to the luminance value. This procedure will be explained generally in the following with reference to FIGS. 13 and 14.

Figure 13:
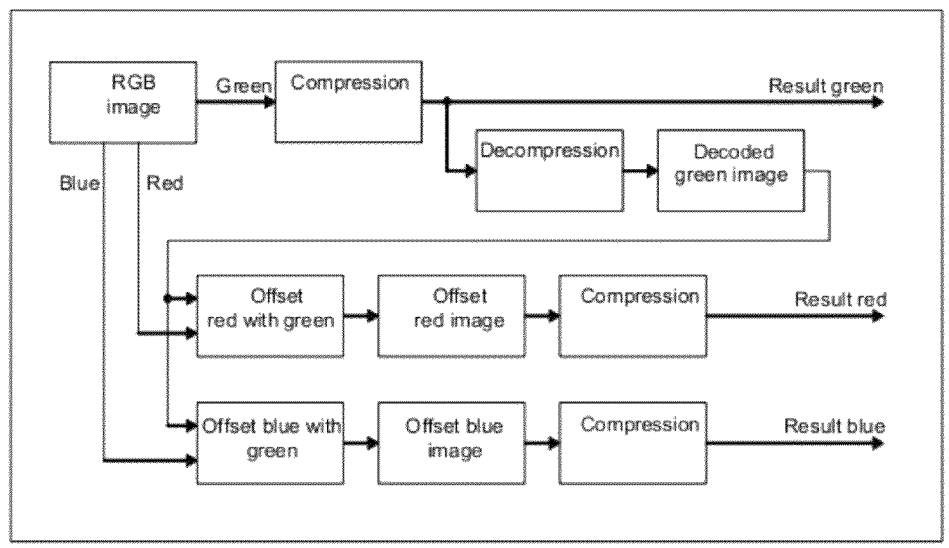
FIG. 13 shows a schematic representation of different compression processes for different color channels of an RGB image.

It is shown in FIG. 13 that with an RGB image which includes image data for three different color channels, the compression can be carried out separately by color channel. The pixel values of the second color (red) and of the third color (blue) are modified in dependence on the pixel values of the first color (green) (for example by the formation of a difference or of a quotient) after the pixel values of the first color have been coded and decoded again. The determination of an estimated pixel value of a respective pixel of the second color (red) or of the third color (blue) thus takes place in dependence on the pixel value of the respective color of at least one predetermined other pixel after this pixel value has been modified in the named manner. In other words, the estimated pixel values and the actual pixel values are color difference values or color quotient values, for example. This operation can be reversed again on the decoding of the pixel values of the second color and of the third color since the pixel values of the first color are also available on decoding. The explained procedure, however, also has an advantageous effect on the efficiency of the compression.

Figure 14:
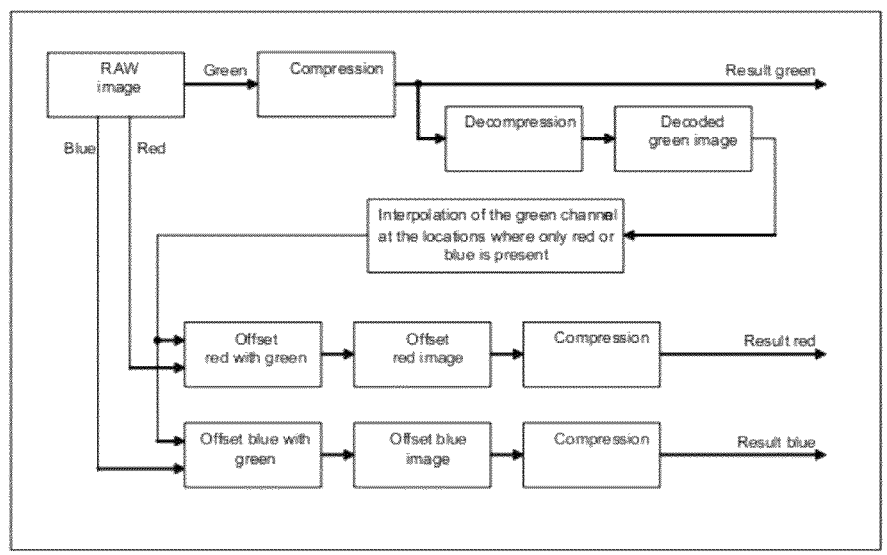
FIG. 14 shows a schematic representation of different compression processes for different color channels of a RAW image.

FIG. 14 shows a similar process for the image data of a RAW image in which only a single piece of color information is present at each image location. Here, an interpolation is only carried out using the pixel values of the first color channel (green) after the coding and the decoding again to obtain a respective pixel value of the first color channel also for the location of the pixels of the second or third color channels. In this manner, a mutual offset of the color channels can again take place, as provided in FIG. 13, i.e. the pixel values of the second color (red) and of the third color (blue) are modified in dependence on the interpolated pixel values of the first color (green) (for example by the formation of a difference or of a quotient). The determination of an estimated pixel value of a respective pixel of the second color (red) or of the third color (blue) then in particular takes place in dependence on the respective pixel value of the four directly adjacent pixels of the first color (green) and preferably also in dependence on the pixel value of at least one other pixel of the respective color (red or blue) after this other pixel has been modified in the named manner. This operation can be reversed again on the decoding of the pixel values of the second color and of the third color since the pixel values of the first color are also available on decoding. The explained procedure, however, also has an advantageous effect on the efficiency of the compression.

The invention claimed is:

1. A method of compressing image data which include a plurality of pixel values which are associated with a respective pixel,
   wherein the pixel values for at least some pixels are coded in accordance with the following steps:
   (b) determining an estimated pixel value of the respective pixel in dependence on the pixel value of at least one predetermined other pixel while using at least one estimation rule; and
   (d) forming a difference value of the respective pixel which corresponds to a predefined relation between the pixel value and the estimated pixel value of the respective pixel and quantization of the difference value in accordance with a difference value quantization rule;
   wherein the quantized difference values of the pixels are compressed in accordance with a compression rule;
   wherein a quantization error for the respective is determined in or after step (d) of the quantization of the difference value, with the quantization error being taken into account for the later quantization of the difference value of at least one other pixel; and
   wherein the pixels are provided in an arrangement of a plurality of rows and columns, with the columns being associated with a plurality of column groups of which each includes a plurality of columns, with the pixel values being coded row-wise within each column group and the pixel values of the different column groups being coded in parallel, with, after reaching a respective row end in one of the plurality of column groups, a quantization error determined in this column group being used for the coding of the respective row or of a subsequent row in at least one adjacent column group.

2. A method in accordance with claim 1, wherein the same difference value quantization rule is used for the quantization of the difference values;
   or
   wherein in each case at least one of a plurality of different difference value quantization rules are selected for the quantization of the difference values.

3. A method in accordance with claim 1, wherein, in the step (d), the difference value of the respective pixel is compared with a threshold value, wherein instead of the difference value a replacement value is quantized and compressed in step (d) if the difference value is larger in amount than the threshold value.

4. A method in accordance with claim 1, wherein, in accordance with the difference value quantization rule, difference values larger in amount are quantized more coarsely than difference value smaller in amount.

5. A method in accordance with claim 1, wherein the quantization error is determined in that the quantized difference value of the respective pixel is back-transformed while using a difference value back transformation rule which corresponds to a reversal of the difference value quantization rule and in that a respective difference is formed between the back-transformed difference value and the original difference value.

6. A method in accordance with claim 1, wherein the quantization error determined for the respective pixel is used to influence the later quantization of the difference value of at least one other pixel such that a sum of quantization errors for the plurality of pixels does not grow or does not exceed a predetermined limit value.

7. A method in accordance with claim 1, wherein the quantization error determined for the respective pixel is taken into account for the later quantization of the difference value of at least one other pixel such that the quantization error is partly or fully added to the difference value of the respective other pixel or is subtracted from the difference value before or while the difference value quantization rule is applied to this difference value.

8. A method of compressing image data which include a plurality of pixels, wherein each pixel can assume a plurality of pixel values, with the pixel values being coded and decoded again later, the method comprising the steps a determining a respective estimation value for each pixel in dependence on the pixel value of at least one predetermined other pixel for coding the pixel value of a respective pixel while using an estimation rule;
   forming a difference value of the respective pixel in dependence on the estimation value and on the pixel value;
   determining a respective reproduced estimation value for the decoding of the pixel value of the respective pixel in dependence on at least one previously decoded pixel value of the predetermined adjacent pixel while using the estimation rule; offsetting the reproduced estimation value with the difference value of the respective pixel to determine a decoded pixel value of the respective pixel;

wherein the pixels are provided in an arrangement of a plurality of rows, with the pixel values being coded in accordance with a predetermined row order such that pixel values of the respective third-next row and pixel values of the respective preceding row being alternately coded, with the determination of the estimated pixel values of the respective pixel taking place in dependence on the pixel value of at least one predetermined other pixel which is arranged in the row preceding it for the coding of pixel values of the named respective third-next line, and with the determination of the estimated pixel values of the respective pixel taking place in dependence on the respective pixel value of a plurality of other predetermined pixels which are arranged in the row preceding it and in the row following it for the coding of pixel values of the named respective preceding row.

9. A method in accordance with claim 8, wherein the estimated pixel value is only determined for each second pixel within the respective row, with the estimated pixel value being determined for the remaining pixels independently of the named row order in dependence on the respective pixel value of four directly adjacent pixels which have already been coded and decoded.

10. A method of compressing image data which include a plurality of pixels, wherein each pixel can adopt a plurality of pixel values, the method comprising the steps of:
    quantizing the pixel value for at least some of the pixels while using at least one quantization rule;
    compressing the quantized pixel values in accordance with a compression rule; and
    determining quantization error for the respective pixel, with the quantization error being taken into account for the later quantization of the pixel value of at least one other pixel;
    wherein the pixels are provided in an arrangement of a plurality of rows and columns, with the columns being associated with a plurality of column groups of which each includes a plurality of columns, with the pixel values being coded row-wise within each column group and the pixel values of the different column groups being coded in parallel, with, after reaching a respective row end in one of the plurality of column groups, a quantization error determined in this column group is used for the coding of the respective row of a subsequent row in at least one adjacent column group.

11. A method in accordance with claim 10, wherein the step of determining a quantization error comprises back-transforming the quantized pixel value of the respective pixel while using a back-transformation rule which corresponds to a reversal of the quantization rule; and forming a respective difference between the back-transformed pixel value and the original pixel value.

12. A method in accordance with claim 10, wherein the quantization error determined for the respective pixel is used to influence the later quantization of the pixel value of at least one other pixel such that a sum of quantization errors for the plurality of pixels does not grow or does not exceed a predetermined limit value.

13. A method in accordance with claim 10, wherein the quantization error determined for the respective pixel is taken into account for the later quantization of the pixel value of at least one other pixel such that the quantization error is partly or fully added to the pixel value of the respective other pixel or is subtracted from the pixel value of the respective other pixel before or while the quantization rule is applied to this pixel value.

14. A method of compressing image data which include a plurality of pixels, wherein each pixel can adopt a plurality of pixel values, with the pixels being coded and later decoded again, the method comprising the steps of:
    quantizing the pixel values for at least some of the pixels during the coding, with the quantization taking place in dependence on a predetermined noise value of the respective pixel; and
    determining a back-transformed pixel value of the respective pixel during the decoding in dependence on the predetermined noise value of the respective pixel;
    wherein the sign of the respective quantized pixel value is changed during the coding in dependence on the sign of the redetermined noise value, the quantized pixel values are compressed and decompressed again later after the coding, and wherein the sign of the respective decompressed quantized pixel is again changed after the decompression of the quantized pixel value during the decoding in dependence on the sign of the predetermined noise value.

15. A method in accordance with claim 14, wherein the predetermined noise value is added to the pixel value during the coding, and wherein the predetermined noise value is added to the back-transformed pixel value of the respective pixel with a reverse sign during the decoding.

16. A method of compressing image data which include a plurality of pixel values which are associated with a respective pixel,
    wherein the pixel values for at least some pixels are coded in accordance with the following steps:
    (b) determining an estimated pixel value of the respective pixel in dependence on the pixel value of at least one predetermined other pixel while using at least one estimation rule; and
    (d) forming a difference value of the respective pixel which corresponds to a predefined relation between the pixel value and the estimated pixel value of the respective pixel and quantization of the difference value in accordance with a difference value quantization rule;
    wherein the quantized difference values of the pixels are compressed in accordance with a compression rule;
    wherein a quantization error for the respective pixel is determined in or after step (d) of the quantization of the difference value, with the quantization error being taken into account for the later quantization of the difference value of at least one other pixel;
    wherein the quantization error determined for the respective pixel is taken into account for the later quantization of the difference value of at least one other pixel such that a quantization correction is carried out for the quantized difference value of the respective other pixel after the difference value quantization rule has been applied to this difference value; and
    wherein a residual quantization value is determined in dependence on the quantized difference value of the respective other pixel for carrying out the quantization correction, with the residual quantization value being offset with the determined quantization error or with a quantization error derived therefrom to determine a modified quantization error, and with the quantized difference value of the respective other pixel being incremented by a positive or negative quantization stage if the modified quantization error exceeds or falls below a predetermined threshold value.

17. A method in accordance with claim 16, wherein the coding of the pixel values additionally includes the step before the formation of the difference value of the respective pixel:
(a) quantizing the pixel value of the respective pixel while using at least one brightness value quantization rule;
with the determination of the estimated pixel value of the respective pixel taking place in dependence on the quantized pixel value of the predetermined other pixel.

18. A method in accordance with claim 17, wherein larger pixel values are quantized more coarsely than smaller pixel values in step (a) in the quantizing of the pixel value while using the at least one brightness value quantizing rule.

19. A method in accordance with claim 17, wherein a quantizing error for the respective pixel is determined in or after step (a) of the quantization of the pixel value, with the quantizing error for the later quantizing of the pixel value of at least one other pixel being taken into account.

20. A method in accordance with claim 16, wherein the pixel value of the predetermined other pixel is coded and decoded again in dependence on the pixel value of the predetermined other pixel before the determination of the estimated pixel value of the respective pixel.

21. A method in accordance with claim 16, wherein the determination of the estimated pixel value of the respective pixel takes place in dependence on the respective pixel value of a plurality of predetermined other pixels, with some of these pixels being arranged directly adjacent to the respective pixel and some further of these pixels being arranged indirectly adjacent to the respective pixel.

22. A method in accordance with claim 16, wherein the pixels are provided in an arrangement of a plurality of rows, with the pixel values being coded row-wise and with the determination of the estimated pixel value of the respective pixel taking place in dependence on the respective pixel value of a plurality of predetermined other pixels which are arranged in an already coded row.

23. A method of compressing image data which include a plurality of pixel values which are associated with a respective pixel,
wherein the pixel values for at least some pixels are coded in accordance with the following steps:
(b) determining an estimated pixel value of the respective pixel in dependence on the pixel value of at least one predetermined other pixel while using at least one estimation rule; and
(d) forming a difference value of the respective pixel which corresponds to a predefined relation between the pixel value and the estimated pixel value of the respective pixel and quantization of the difference value in accordance with a difference value quantization rule;
wherein the quantized difference values of the pixels are compressed in accordance with a compression rule; and
wherein the pixels can be provided in an arrangement of a plurality of rows, with the pixel values being coded row-wise in accordance with a row order such that some or all pixel values of the respective third-next row and some or all pixel values of the respective preceding row being alternately coded, with the determination of the estimated pixel value of the respective pixel taking place in dependence on the pixel value of at least one predetermined other pixel which is arranged in the row pre-preceding it for the coding of pixel values of the named respective third-next line, and with the determination of the estimated pixel value of the respective pixel taking place in dependence on the respective pixel value of a plurality of other pixels which are arranged in the row pre-preceding it and in the row following it for the coding of pixel values of the named respective preceding row.

24. A method in accordance with claim 23, wherein the estimated pixel value is only determined for each second pixel within the respective row, with the estimated pixel value being determined for the remaining pixels independently of the named row order in dependence on the respective pixel value of four directly adjacent pixels which have already been coded.

25. A method in accordance with claim 23, wherein in accordance with the estimation rule the determination of the estimated pixel value of the respective pixel takes place in dependence on an averaged value of the pixel values of a plurality of predetermined other pixels.

26. A method in accordance with claim 23, wherein the determination of the estimated pixel value of the respective pixel takes place in dependence on the pixel values of a plurality of predetermined other pixels, with an edge structure being taken into account in accordance with the estimation rule which is contained in the image information of the pixel values of the plurality of predetermined other pixels.

27. A method in accordance with claim 23, wherein at least one of a plurality of different estimation rules is selected for the determination of the estimated pixel value of the respective pixel.

28. A method in accordance with claim 23, wherein a plurality of estimated pixel values are determined for the respective pixel while using different estimation rules, with a significance value being generated for each estimation rule, and with at least one of the plurality of estimated pixel values being selected in dependence on the generated significance values for the coding.

29. A method of compressing image data which include a plurality of pixel values which are associated with a respective pixel,
wherein the pixel values for at least some pixels are coded in accordance with the following steps:
(b) determining an estimated pixel value of the respective pixel in dependence on the pixel value of at least one predetermined other pixel while using at least one estimation rule; and
(d) forming a difference value of the respective pixel which corresponds to a predefined relation between the pixel value and the estimated pixel value of the respective pixel and quantization of the difference value in accordance with a difference value quantization rule;
wherein the quantized difference values of the pixels are compressed in accordance with a compression rule;
wherein at least one set of image zone values is generated in dependence on the pixel values before the coding of the pixel values, with each image zone value being associated with a group of pixels so that the image zone values correspond to an image of reduced spatial resolution, with the determination of the estimated pixel value of the respective pixel taking place in accordance with the estimation rule in dependence also on at least one of the image zone values, and with the image zone values also being compressed; and
wherein the determination of an estimated pixel value of the respective pixel furthermore including the following steps:
determining an estimated intermediate image zone value in dependence on at least the pixel value of the predetermined other pixel and on the respective image zone value while using the at least one estimation rule, with the intermediate image zone value being associated with a smaller group of pixels than the image zone value; and determining the estimated pixel value of the respective pixel in dependence on at least the pixel value of the predetermined other pixel and on the respective intermediate image zone value while using the at least one estimation rule.

30. A method in accordance with claim 29, wherein the step of determining an estimated intermediate image zone value is repeated to determine estimated intermediate image zone values which are associated with a still smaller group of pixels than the previously determined intermediate image zone values.

31. A method in accordance with claim 29, wherein the image data are moving image data which correspond to a time sequence of image data sets, with at least one respective pixel reference value being associated with the pixels in addition to the respective pixel value, said respective pixel reference value corresponding to a pixel value of a preceding image data set of the time sequence, with the determination of the estimated pixel value of the respective pixel taking place in accordance with the estimation rule in dependence also on at least one of the pixel reference values.

32. A method in accordance with claim 29, wherein the pixel values of a plurality of different pixels are simultaneously coded.

33. A method in accordance with claim 29, wherein the image data include pixel values of a first color, pixel values of a second color, and pixel values of a third color, with the pixel values of the second color being modified in dependence on the pixel values of the first color before the pixel values of the second color are coded and the pixel values of the third color being modified in dependence on the pixel values of the first color before the pixel values of the third color are coded.

34. A method in accordance with claim 33, wherein the pixel values of the first color are coded and decoded again before the respective modification of the pixel values of the second and third colors.

35. A method in accordance with claim 29, wherein the quantized difference values of the pixels are compressed in a loss-free manner in accordance with a known compression rule.

36. A method of compressing image data which include a plurality of pixel values which are associated with a respective pixel, wherein the pixel values for at least some pixels are coded in accordance with the following steps:

(b) determining an estimated pixel value of the respective pixel in dependence on the pixel value of at least one predetermined other pixel while using at least one estimation rule; and (d) forming a difference value of the respective pixel which corresponds to a predefined relation between the pixel value and the estimated pixel value of the respective pixel and quantization of the difference value in accordance with a difference value quantization rule;

wherein the quantized difference values of the pixels are compressed in accordance with a compression rule;

wherein the quantized difference values of the pixels are decompressed in accordance with a decompression rule for the decompression of the image data which corresponds to a reversal of the compression rule and with the pixel values being decoded in accordance with the following steps:

(e) determining a reproduced estimated pixel value of the respective pixel in dependence on at least one previously decoded pixel value which corresponds to the at least one predetermined other pixel while using the at least one estimation rule; and (g) determining a back-transformed difference value of the respective pixel in dependence on the decompressed quantized difference value while using a difference value back-transformation rule which corresponds to a reversal of the difference value quantization rule, and determining a decoded pixel value of the respective pixel in dependence on the back-transformed difference value and on the reproduced estimated pixel value of the respective pixel;

wherein the quantization of the difference value of the respective pixel takes place during the coding of the pixel values in step (d) in dependence also on a predetermined noise value of the respective pixel, with the determination of the decoded pixel value of the respective pixel taking place during the decoding of the pixel values in step (g) likewise in dependence on the predetermined noise value of the respective pixel; and wherein the sign of the quantized difference value is changed during the coding of the pixel value in dependence on the sign of the predetermined noise value before the compression, with the sign of the decompressed quantized difference value of the respective pixel again being changed during the decoding of the pixel values in dependence on the sign of the predetermined noise value.

37. A method in accordance with claim 36, wherein the pixel values are decoded in accordance with a specific order of the pixels, and wherein the arrangement of the at least one predetermined other pixel is selected such that the pixel value has already been decoded in accordance with the specific order for this predetermined other pixel when the reproduced estimated pixel value of the respective pixel is determined.

38. A method in accordance with claim 36, wherein some of the plurality of pixel values are not coded or are not completely coded, with these pixel values being used in the determination of the reproduced estimated pixel value as a respective replacement value for the named previously decoded pixel value of the at least one predetermined other pixel.

39. A method in accordance with claim 36, wherein the coding of the pixel values additionally includes the step before the formation of the difference value of the respective pixel:

(a) quantizing the pixel value of the respective pixel while using at least one brightness value quantization rule;

with the determination of the estimated pixel value of the respective pixel in step (b) taking place in dependence on the quantized pixel value of the predetermined other pixel, with the determination of the decoded pixel value of the respective pixel in step (g) also including a back-transformation of the pixel value during the decoding of the pixel values while using a brightness value back-transformation rule which corresponds to a reversal of the brightness quantization rule.

40. A method in accordance with claim 36, wherein the coding of the pixel values additionally includes the step before the formation of the difference value of the respective pixel:

(a) quantizing the pixel value of the respective pixel while using at least one brightness value quantization rule;

with the determination of the estimated pixel value of the respective pixel in the step (b) taking place in dependence on the quantized pixel value of the predetermined other pixel, with the quantization of the pixel value of the respective pixel taking place in step (a) in dependence also on a predetermined noise value of the respective pixel, with the determination of the decoded pixel value of the respective pixel in step (g) taking place in dependence also on the predetermined noise value of the respective pixel during the decoding of the pixel values.

41. A method in accordance with claim 40, wherein a noise compensation value is determined during the coding of the pixel values in dependence on the respective formed difference value and on the respective predetermined noise value of the respective pixel and, in step (d), the respective difference value is reduced in dependence on the determined noise compensation value before the compression.

42. A method in accordance with claim 36, wherein, in step (d), the predetermined noise value is added to the pixel value or to the difference value of the respective pixel and, in step (g), the predetermined noise value is added to the back-transformed difference value or to the decoded pixel value of the respective pixel with a reverse sign.

43. A method in accordance with claim 36, wherein the predetermined noise value is generated by means of a pseudo-random generator.

44. A method of compressing image data which include a plurality of pixels, wherein each pixel can adopt a plurality of pixel values, the method comprising the steps of:

quantizing the pixel value for at least some of the pixels while using at least one quantization rule;

compressing the quantized pixel values in accordance with a compression rule; and determining a quantization error for the respective pixel, with the quantization error being taken into account for the later quantization of the pixel value of at least one other pixel;

wherein the quantization error determined for the respective pixel is taken into account for the later quantization of the pixel value of at least one other pixel such that a quantization correction is carried out for the quantized difference value of the respective other pixel after the quantization rule has been applied to this pixel value; and wherein a residual quantization value is determined in dependence on the quantized pixel value of the respective other pixel for carrying out the quantization correction, with the residual quantization value being offset with the determined quantization error or with a quantization derived therefrom to determine a modified quantization error, and with the quantized pixel value of the respective other pixel being incremented by a positive or negative quantization stage if the modified quantization error exceeds or falls below a predetermined threshold value.

* * * * *